(12) United States Patent
Kabasawa et al.

(10) Patent No.: US 11,137,248 B2
(45) Date of Patent: Oct. 5, 2021

(54) SENSOR ELEMENT, INERTIAL SENSOR, AND ELECTRONIC APPARATUS

(71) Applicant: SONY SEMICONDUCTOR SOLUTIONS CORPORATION, Kanagawa (JP)

(72) Inventors: Hidetoshi Kabasawa, Kanagawa (JP); Yusaku Kato, Kanagawa (JP); Satoshi Mitani, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 134 days.

(21) Appl. No.: 16/331,412

(22) PCT Filed: Oct. 3, 2017

(86) PCT No.: PCT/JP2017/035956
§ 371 (c)(1),
(2) Date: Mar. 7, 2019

(87) PCT Pub. No.: WO2018/088065
PCT Pub. Date: May 17, 2018

(65) Prior Publication Data
US 2019/0265034 A1    Aug. 29, 2019

(30) Foreign Application Priority Data

Nov. 11, 2016   (JP) .............................. JP2016-220964

(51) Int. Cl.
*G01C 19/5649*   (2012.01)
*G01P 15/09*     (2006.01)
(Continued)

(52) U.S. Cl.
CPC ......... *G01C 19/5649* (2013.01); *G01C 19/56* (2013.01); *G01P 15/08* (2013.01);
(Continued)

(58) Field of Classification Search
CPC .......... G01P 15/08; G01P 15/09; G01P 15/12; G01P 15/123; G01P 15/125; G01P 15/18;
(Continued)

(56) References Cited

U.S. PATENT DOCUMENTS 4,901,570 A * 2/1990 Chang ................... G01P 15/097
73/514.29
2009/0266164 A1   10/2009 Furukubo et al.
(Continued)

FOREIGN PATENT DOCUMENTS

CN  101432627 A   5/2009
CN  102654409 A   9/2012
(Continued)

OTHER PUBLICATIONS

International Search Report and Written Opinion of PCT Application No. PCT/JP2017/035956, dated Jan. 9, 2018, 08 pages of ISRWO.
Office Action for CN Patent Application No. 20178067584.7.6, dated Feb. 9, 2021, 06 page of Office Action and 05 pages of Translation.

*Primary Examiner* — Nimeshkumar D Patel
*Assistant Examiner* — Jean F Morello
(74) *Attorney, Agent, or Firm* — Chip Law Group

(57) ABSTRACT

A sensor element according to the present technology includes a base portion, a movable portion, first and second bridge portions, and an acceleration detector unit. The movable portion is movable relative to the base portion by reception of an acceleration along at least a uniaxial direction. The first bridge portion includes a first beam and a first structure, the first beam connects the base portion and the movable portion, the first structure being provided between the first beam and the base portion and supporting the first beam. The second bridge portion includes a second beam and a second structure, the second beam extends in a second axis direction orthogonal to the first axis and parallel to the (Continued)

main surface and connects the base portion and the movable portion, the second structure being provided between the second beam and the base portion and supports the second beam.

9 Claims, 20 Drawing Sheets

(51) Int. Cl.
- *G01P 15/12* (2006.01)
- *G01P 15/125* (2006.01)
- *G01P 15/18* (2013.01)
- *G01C 19/56* (2012.01)
- *G01P 15/08* (2006.01)

(52) U.S. Cl.
CPC .............. *G01P 15/09* (2013.01); *G01P 15/12* (2013.01); *G01P 15/123* (2013.01); *G01P 15/125* (2013.01); *G01P 15/18* (2013.01)

(58) Field of Classification Search
CPC ............ G01P 2015/0842; G01C 19/56; G01C 19/5642; G01C 19/5649
USPC ........................................................ 73/504.12
See application file for complete search history.

(56) References Cited

U.S. PATENT DOCUMENTS

| | | |
|---|---|---|
| 2011/0234206 A1 | 9/2011 | Kawakubo et al. |
| 2015/0135834 A1 | 5/2015 | Kim et al. |

FOREIGN PATENT DOCUMENTS

| | | |
|---|---|---|
| CN | 105319393 A | 2/2016 |
| EP | 2023152 A1 | 2/2009 |
| JP | 04-178561 A | 6/1992 |
| JP | 05-333052 A | 12/1993 |
| JP | 07-167885 A | 7/1995 |
| JP | 2007-298383 A | 11/2007 |
| JP | 2007-298410 A | 11/2007 |
| JP | 2011-203228 A | 10/2011 |
| JP | 2011-257209 A | 12/2011 |
| JP | 2013-125025 A | 6/2013 |
| JP | 2015-092145 A | 5/2015 |
| JP | 2016-059191 A | 4/2016 |
| KR | 10-1012248 B1 | 2/2011 |
| KR | 10-2015-0059065 A | 5/2015 |
| TW | 200804814 A | 1/2008 |
| TW | 201024737 A | 7/2010 |
| WO | 2007/125961 A1 | 11/2007 |

\* cited by examiner

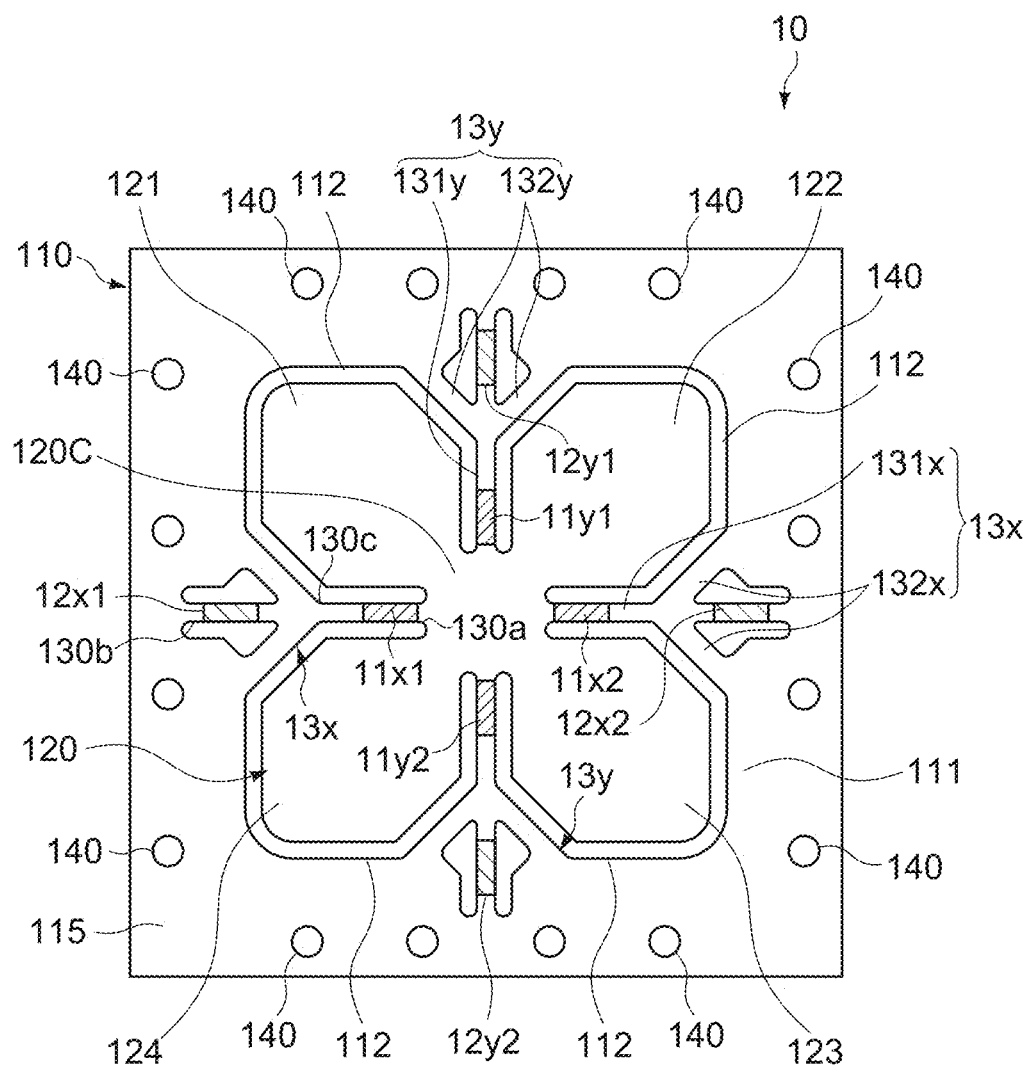
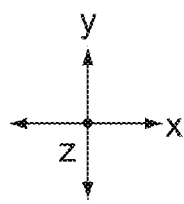
FIG.4

Rotate about Z axis
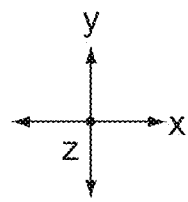
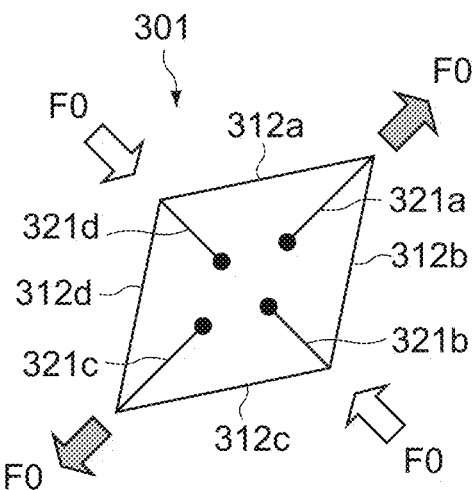
FIG.19A
Rotate about X axis
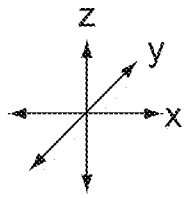
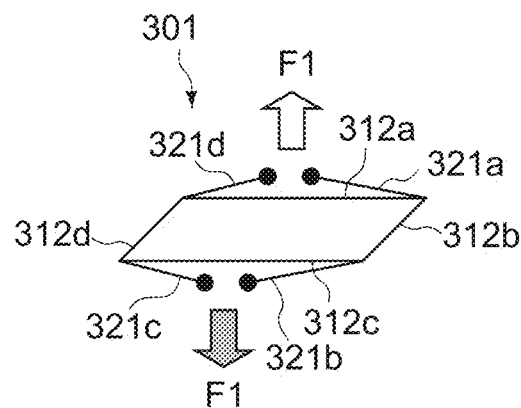
FIG.19B
Rotate about Y axis
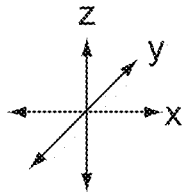
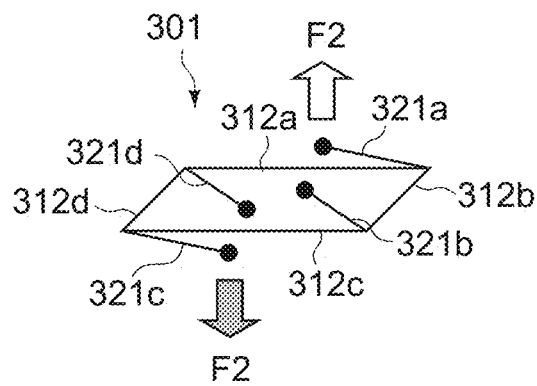
FIG.19C

SENSOR ELEMENT, INERTIAL SENSOR, AND ELECTRONIC APPARATUS

CROSS REFERENCE TO RELATED APPLICATIONS

This application is a U.S. National Phase of International Patent Application No. PCT/JP2017/035956 filed on Oct. 3, 2017, which claims priority benefit of Japanese Patent Application No. JP 2016-220964 filed in the Japan Patent Office on Nov. 11, 2016. Each of the above-referenced applications is hereby incorporated herein by reference in its entirety.

TECHNICAL FIELD

The present technology relates to a sensor element that detects an acceleration, and to an inertial sensor and an electronic apparatus each including the sensor element.

BACKGROUND ART

In recent years, acceleration sensors using the MEMS (Micro Electro Mechanical Systems) technology have been widely used in the technical fields of posture detection of an electronic apparatus, position detection of a moving body, image stabilization of a camera, analysis of a motion of a human or object, and the like. In this type of acceleration sensors, there are known various detection methods such as a piezoelectric type, a piezoresistive type, and an electrostatic type (see, for example, Patent Literatures 1 to 3).

For example, Patent Literature 1 describes an inertial sensor that includes a membrane, a mass body provided at a lower part of the membrane, and detection means formed on the membrane and including a piezoelectric body and that measures an acceleration on the basis of an output of the detection means.

Further, Patent Literature 2 describes an inertial sensor that includes a plate-shaped member, a weight body, plate-shaped bridge parts connecting them, and piezoresistive elements respectively disposed at the root ends and tips of the plate-shaped bridge parts and that detects accelerations from the resistance variations of those piezoresistive elements.

Additionally, Patent Literature 3 describes an electrostatic device that includes a first electrode unit as a movable electrode and a second electrode unit as a fixed electrode and that detects a change in capacitance based on a change of a gap therebetween, to measure an acceleration.

CITATION LIST

Patent Literature

Patent Literature 1: Japanese Patent Application Laid-open No. 2013-125025
Patent Literature 2: Japanese Patent Application Laid-open No. 2015-92145
Patent Literature 3: Japanese Patent Application Laid-open No. 2016-59191

DISCLOSURE OF INVENTION

Technical Problem

In an acceleration sensor that detects accelerations in multiaxial directions by using a single sensor, the influence to be imparted to acceleration detection characteristics by variations in shape or electrode position becomes relatively large along with the reduction in size of the sensor. This makes it difficult to separate detection modes, and the sensitivity along other axes is generated, which makes it difficult to obtain desired acceleration detection characteristics.

In view of the circumstances as described above, it is an object of the present technology to provide a sensor element, an inertial sensor, and an electronic apparatus that are capable of suppressing the generation of the sensitivity along other axes and obtaining desired acceleration detection characteristics.

Solution to Problem

A sensor element according to an embodiment of the present technology includes a base portion, a movable portion, a first bridge portion, a second bridge portion, and a first acceleration detector unit.

The base portion has a main surface.

The movable portion is configured to be movable relative to the base portion by reception of an acceleration along at least a uniaxial direction.

The first bridge portion includes a first beam and a first structure. The first beam extends in a first axis direction parallel to the main surface and connects the base portion and the movable portion. The first structure is provided between the first beam and the base portion and supports the first beam.

The second bridge portion includes a second beam and a second structure. The second beam extends in a second axis direction orthogonal to the first axis and parallel to the main surface and connects the base portion and the movable portion. The second structure is provided between the second beam and the base portion and supports the second beam.

The first acceleration detector unit is disposed on each of the first beam and the second beam and outputs a first detection signal corresponding to an amount of deformation of each of the first beam and the second beam.

Since the sensor element includes the first and second structures, the torsional deformation of the second beam is suppressed when the acceleration along the first axis direction acts on the movable portion, and the torsional deformation of the first beam is suppressed when the acceleration along the second axis direction acts on the movable portion. With this configuration, it is possible to effectively suppress the generation of the sensitivity along other axes and improve the detection accuracy of an acceleration in each axis.

Each of the first beam and the second beam may include a first end portion connected to the movable portion, a second end portion connected to the base portion, and a joint portion provided between the first end portion and the second end portion. Each of the first structure and the second structure may be provided between the base portion and the joint portion.

Depending on the position of the joint portion, the flexural rigidity of the bridge portion in each of an in-plane direction and an out-of-plane direction can be optimized.

The configuration of each of the first structure and the second structure is not particularly limited. For example, each of the first structure and the second structure includes a pair of reinforcement beams that are not parallel to the first beam and the second beam.

The first acceleration detector unit is typically disposed on each of the first beam and the second beam, for example, disposed between the first end portion and the joint portion on each of the first beam and the second beam.

With this configuration, it is possible to suppress the generation of the sensitivity along other axes while maintaining the detection sensitivity of the acceleration that acts on the movable portion.

The sensor element may further include a second acceleration detector unit. The second acceleration detector unit is disposed on each of the first beam and the second beam and outputs a second detection signal corresponding to an amount of deformation of each of the first beam and the second beam.

The second acceleration detector unit is disposed, for example, between the second end portion and the joint portion.

The configuration of each of the first acceleration detector unit and the second acceleration detector unit is not particularly limited. For example, the first acceleration detector unit includes a piezoelectric acceleration detection element, and the second acceleration detector unit includes any one of a piezoelectric acceleration detection element, a piezoresistive acceleration detection element, and an electrostatic acceleration detection element.

The base portion may have a frame shape surrounding a circumference of the movable portion. In this case, the movable portion has a shape symmetric with respect to the center of the base portion, and each of the first beam and the second beam includes a pair of beam portions facing each other with the movable portion being sandwiched therebetween.

With this configuration, it is possible to obtain isotropic acceleration detection characteristics with respect to the reduction in size of the sensor element.

The movable portion may include a center portion supported by the first beam and the second beam, a plurality of wing portions each having a shape symmetric with respect to the center portion, and weight portions respectively provided to the plurality of wing portions.

With this configuration, it is possible to increase the detection sensitivity of an acceleration while maintaining the reduction in size of the sensor element.

An inertial sensor according to an embodiment of the present technology includes a sensor element.

The sensor element includes
a first base portion having a first main surface,
a movable portion that is movable relative to the first base portion by reception of an acceleration along at least a uniaxial direction,
a first bridge portion including
  a first beam that extends in a first axis direction parallel to the first main surface and connects the first base portion and the movable portion, and
  a first structure that is provided between the first beam and the first base portion and supports the first beam,
a second bridge portion including
  a second beam that extends in a second axis direction orthogonal to the first axis and parallel to the first main surface and connects the first base portion and the movable portion, and
  a second structure that is provided between the second beam and the first base portion and supports the second beam,
a first acceleration detector unit that is disposed on each of the first beam and the second beam and outputs a first detection signal corresponding to an amount of deformation of each of the first beam and the second beam, and
a support including a first housing portion that houses the first base portion.

The inertial sensor may further include a gyro sensor element capable of detecting an angular velocity about at least one axis, and the support may further include a second housing portion that houses the gyro sensor element.

With this configuration, it is possible to configure a sensor package capable of detecting an acceleration and an angular velocity.

The configuration of the gyro sensor element is not particularly limited. For example, the gyro sensor element may include a second base portion, a ring-shaped frame, and an angular velocity detector unit.

The second base portion has a second main surface parallel to the first main surface and is supported by the second housing portion. The ring-shaped frame is supported to be capable of vibrating with respect to the second base portion. The angular velocity detector unit detects an angular velocity about the third axis on a basis of an amount of deformation of the frame in a plane parallel to the second main surface.

The support may include a first recess portion that defines the first housing portion, and a second recess portion that is provided in the first recess portion and defines the second housing portion. In this case, the acceleration sensor element and the angular velocity sensor element are disposed to face each other in the third axis direction.

The first base portion may surround a circumference of the second base portion, and the second base portion may face the bridge portion with a gap therebetween.

With this configuration, it is possible to achieve the reduction in thickness of the entire sensor.

The second base portion is formed into a frame shape surrounding a circumference of the weight portion and faces the circumferential portion of the movable portion with a gap therebetween.

When the base portion is caused to face the circumference of the movable plate, an excessive amount of deformation of the movable plate can be restricted by those abutting actions.

The acceleration sensor element may further include a window portion that is provided between the movable portion and the base portion and partially exposes the frame in the third axis direction.

For example, by irradiation with laser light from above the window portion, it is possible to adjust vibration of the gyro sensor element housed in the support.

The acceleration sensor element may further include a second acceleration detector unit that is disposed on each of the first beam and the second beam and outputs a second detection signal corresponding to an amount of deformation of each of the first beam and the second beam.

The first detection signal may have an alternating-current waveform corresponding to the acceleration that acts on the movable portion, and the second detection signal may have an output waveform in which an alternating-current component corresponding to the acceleration along the acceleration is superimposed on a direct-current component. Additionally, the inertial sensor may further include an arithmetic element that extracts a dynamic acceleration component and a static acceleration component from the acceleration on a basis of the first detection signal and the second detection signal.

The support may further include a third housing portion that houses the arithmetic element.

An electronic apparatus according to an embodiment of the present technology includes a sensor element.

The sensor element includes
a base portion having a main surface,
a movable portion that is movable relative to the base portion by reception of an acceleration along at least a uniaxial direction,
a first bridge portion including
   a first beam that extends in a first axis direction parallel to the main surface and connects the base portion and the movable portion, and
   a first structure that is provided between the first beam and the base portion and supports the first beam,
a second bridge portion including
   a second beam that extends in a second axis direction orthogonal to the first axis and parallel to the main surface and connects the base portion and the movable portion, and
   a second structure that is provided between the second beam and the base portion and supports the second beam, and
a first acceleration detector unit that is disposed on each of the first beam and the second beam and outputs a first detection signal corresponding to an amount of deformation of each of the first beam and the second beam.

Advantageous Effects of Invention

As described above, according to the present technology, it is possible to suppress the generation of the sensitivity along other axes and obtain desired acceleration detection characteristics.

It should be noted that the effects described herein are not necessarily limited, and any of the effects described in the present disclosure may be produced.

BRIEF DESCRIPTION OF DRAWINGS

FIG. 4 is a plan view of the front surface side of the acceleration sensor element.

FIG. 16 is a flowchart showing an example of a processing procedure of the acceleration arithmetic unit.

FIG. 19A is a schematic plan view for describing an action of the angular velocity sensor element when an angular velocity about the z axis occurs.

FIG. 19B is a schematic perspective view for describing an action of the angular velocity sensor element when an angular velocity about the x axis occurs.

FIG. 19C is a schematic perspective view for describing an action of the angular velocity sensor element when an angular velocity about the y axis occurs.

MODE(S) FOR CARRYING OUT THE INVENTION

Hereinafter, embodiments according to the present technology will be described with reference to the drawings.

First Embodiment

[Overall Configuration]

Figure 1:
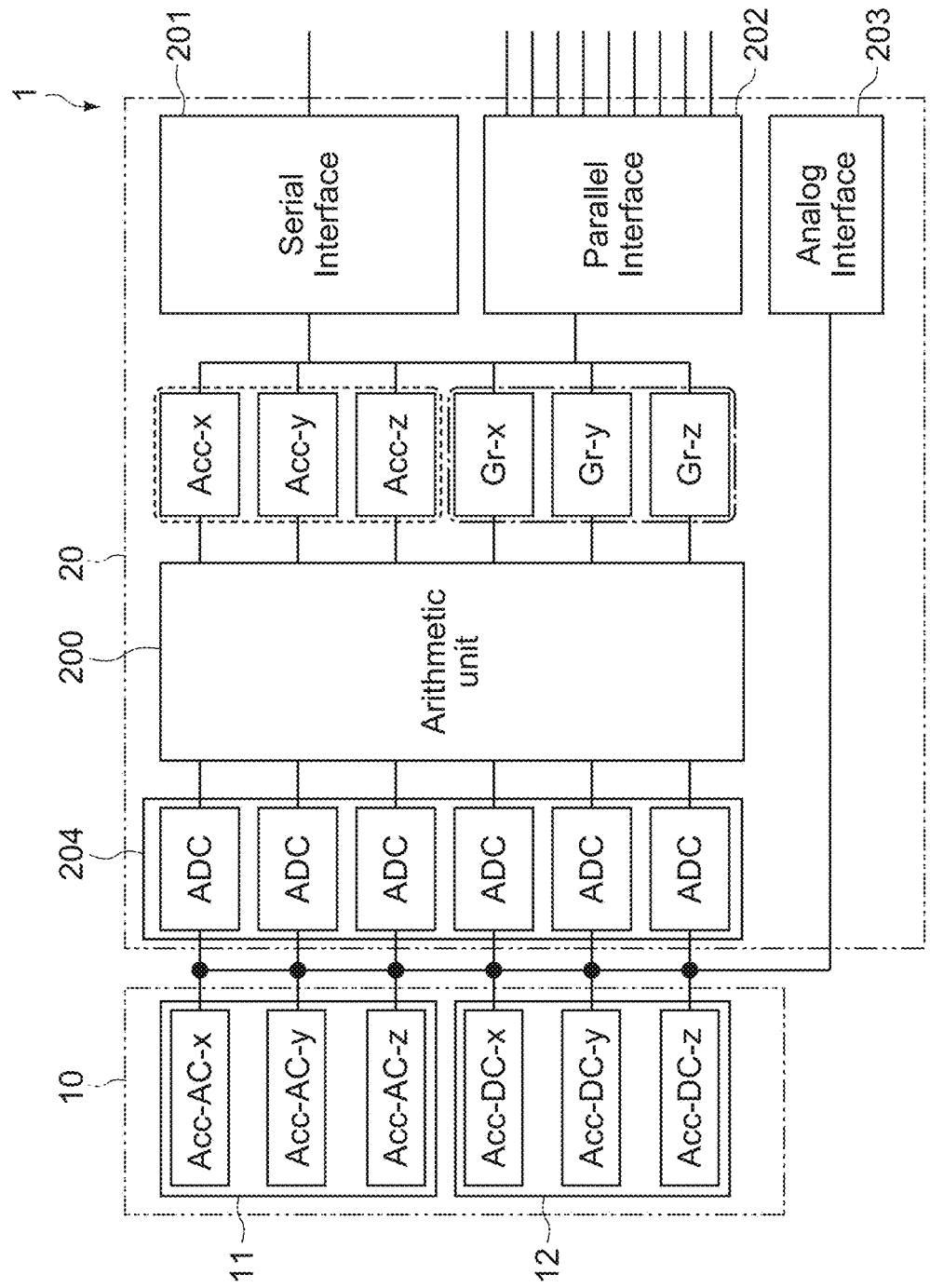
FIG. 1 is a block diagram showing a configuration of an inertial sensor according to a first embodiment of the present technology.

FIG. 1 is a block diagram showing a configuration of an inertial sensor according to an embodiment of the present technology.

An inertial sensor 1 of this embodiment is incorporated in, for example, a moving body such as a vehicle or an aircraft, a portable information terminal such as a smartphone, an electronic apparatus such as a digital camera, a sensor head unit in a motion measurement apparatus, and the like. The inertial sensor 1 is configured as an acceleration sensor that detects accelerations in three-axis directions, which act on an object (detection target) such as the above-mentioned moving body, portable information terminal, electronic apparatus, and sensor head.

The inertial sensor 1 of this embodiment is configured to be capable of extracting dynamic acceleration components and static acceleration components from the respective accelerations in the three-axis directions described above.

Here, the dynamic acceleration component means an AC component of the acceleration described above and typically corresponds to a motion acceleration (translational acceleration, centrifugal acceleration, tangential acceleration, or the like) of the object described above. Meanwhile, the static acceleration component typically means a DC component of the acceleration described above and typically corresponds to a gravitational acceleration or an acceleration estimated as a gravitational acceleration.

Figure 2:
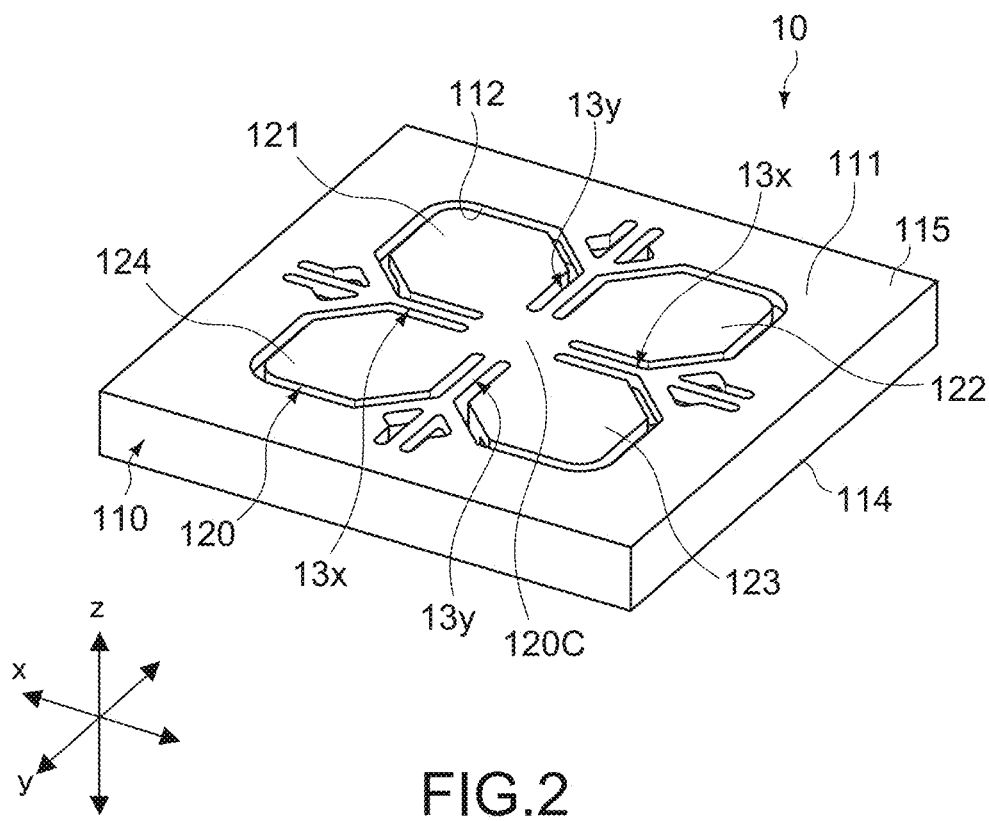
FIG. 2 is a perspective view of the front surface side, schematically showing a configuration of an acceleration sensor element in the inertial sensor.

As shown in FIG. 1, the inertial sensor 1 includes an acceleration sensor element 10 (sensor element) and a controller (arithmetic element). FIG. 2 is a schematic perspective view of the front surface side, schematically showing a configuration of the acceleration sensor element 10.

The acceleration sensor element 10 includes two types of acceleration detector units (first acceleration detector unit 11 and second acceleration detector unit 12) that each detect information related to the accelerations in the three-axis (x, y, and z-axis) directions in FIG. 2.

The first acceleration detector unit 11 is a piezoelectric acceleration sensor, for example, and outputs, as a first detection signal, each of a signal (Acc-AC-x) including information associated with an acceleration parallel to the x-axis direction, a signal (Acc-AC-y) including information associated with an acceleration parallel to the y-axis direction, and a signal (Acc-AC-z) including information associated with an acceleration parallel to the z-axis direction. Those signals each have an alternating-current waveform corresponding to the acceleration of each axis.

Meanwhile, the second acceleration detector unit 12 is a non-piezoelectric acceleration sensor and outputs, as a second detection signal, each of a signal (Acc-DC-x) including information associated with an acceleration parallel to the x-axis direction, a signal (Acc-DC-y) including information associated with an acceleration parallel to the y-axis direction, and a signal (Acc-DC-z) including information associated with an acceleration parallel to the z-axis direction. Those signals each have an output waveform in which an alternating-current component corresponding to the acceleration of each axis is superimposed on a direct-current component.

The controller 20 includes an acceleration arithmetic unit 200 that extracts dynamic acceleration components and static acceleration components from the respective accelerations in the three-axis directions described above on the basis of the output of the first acceleration detector unit 11 (first detection signals) and the output of the second acceleration detector unit 12 (second detection signals).

It should be noted that the controller 20 may be achieved by hardware elements such as a CPU (Central Processing Unit), a RAM (Random Access Memory), and a ROM (Read Only Memory) used in a computer and necessary software. Instead of or in addition to the CPU, a PLD (Programmable Logic Device) such as a FPGA (Field Programmable Gate Array), a DSP (Digital Signal Processor), or the like may be used.

It should be noted that the controller 20 may further be constituted of an arithmetic circuit incorporated in a controller unit of the electronic apparatus or may be constituted of an electronic component (e.g., IC chip or semiconductor package component) configured separately from the controller unit.

Subsequently, details of the inertial sensor 1 will be described.

[Sensor Element]

(Basic Configuration)

Figure 3:
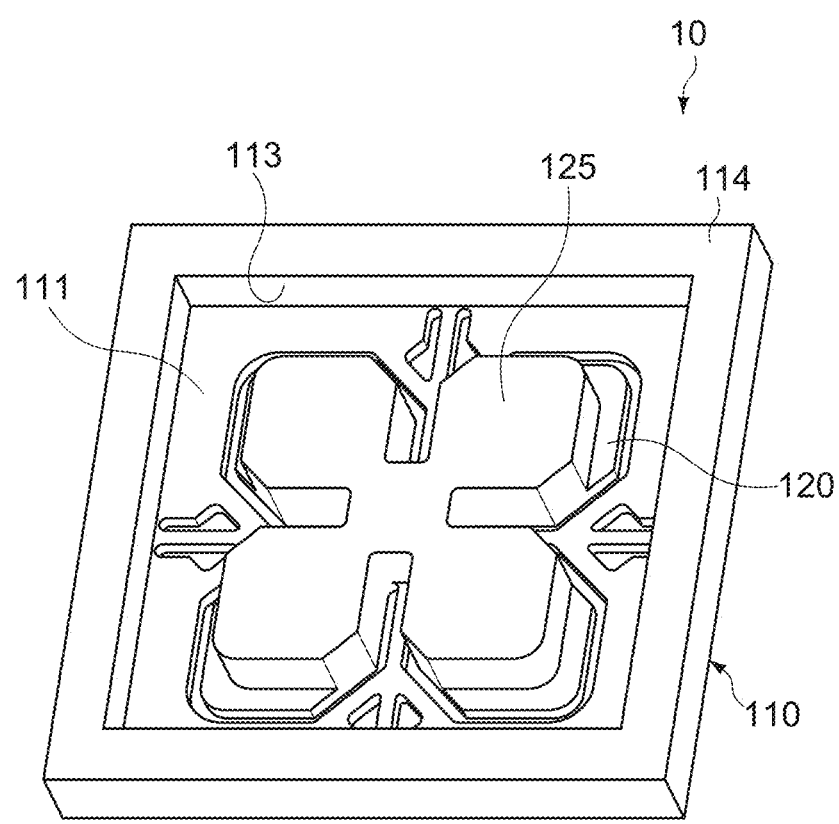
FIG. 3 is a perspective view of the back surface side of the acceleration sensor element.

First, a basic configuration of the acceleration sensor element 10 will be described with reference to FIGS. 2 to 4. FIG. 3 is a perspective view of the back surface side of the acceleration sensor element 10. FIG. 4 is a plan view of the front surface side of the acceleration sensor element 10.

The acceleration sensor element 10 includes an element main body 110, the first acceleration detector unit 11 (first detection elements 11$x$1, 11$x$2, 11$y$1, 11$y$2) and the second acceleration detector unit 12 (second detection elements 12$x$1, 12$x$2, 12$y$1, 12$y$2).

The element main body 110 includes a base portion 115, a movable plate 120 (movable portion), and bridge portions 13$x$ and 13$y$.

The element main body 110 includes a main surface portion 111 (first main surface) parallel to the xy plane and a support portion 114 on the opposite side. The element main body 110 is typically constituted of an SOI (Silicon On Insulator) substrate and has a laminated structure including an active layer (silicon substrate), which forms the main surface portion 111, a frame-shaped support layer (silicon substrate), which forms the support portion 114, and a joint layer (silicon oxide film) (not shown), which joins the main surface portion 111 and the support portion 114. The main surface portion 111 and the support portion 114 have thicknesses different from each other, and the support portion 114 is formed to be thicker than the main surface portion 111.

The element main body 110 includes a movable plate 120 (movable portion) capable of moving by reception of an acceleration. The movable plate 120 is provided at the center portion of the main surface portion 111 and is formed by processing the active layer forming the main surface portion 111 into a predetermined shape. More specifically, the movable plate 120 including a plurality of (four in this example) blade portions 121, 122, 123, and 124 (wing portions) each having the shape symmetric with respect to the center portion (center portion 120C) of the main surface portion 111 is constituted by a plurality of groove portions 112 formed in the main surface portion 111. The circumferential portion of the main surface portion 111 faces the support portion 114 in the z-axis direction, and the main surface portion 111 and the support portion 114 constitute a base portion 115.

As shown in FIG. 3, the support portion 114 is formed into a frame including a rectangular recess portion 113 in which the back surface of the movable plate 120 is opened. The support portion 114 is constituted as a joint surface to be joined to a support substrate (not shown in the figure). The support substrate may be constituted of a circuit board that electrically connects the acceleration sensor element 10 and the controller 20 or may be constituted of a relay board or package board that is electrically connected to the circuit board. Alternatively, the support portion 114 may include a plurality of external connection terminals electrically connected to the circuit board, the relay board, or the like.

The blade portions 121 to 124 of the movable plate 120 are each constituted of a piece of board having a predetermined shape (substantially hexagonal shape in this example) and are disposed at intervals of 90° about the center axis parallel to the z axis. The thickness of each of the blade portions 121 to 124 corresponds to the thickness of the above-mentioned active layer constituting the main surface portion 111. The blade portions 121 to 124 are mutually integrally connected at the center portion 120C of the movable plate 120 and are integrated and supported so as to be movable relative to the base portion 115.

As shown in FIG. 3, the movable plate 120 further includes a weight portion 125. The weight portion 125 is integrally provided to the back surface of the center portion 120C of the movable plate 120 and the back surfaces of the respective blade portions 121 to 124. The size, the thickness, and the like of the weight portion 125 are not particularly limited and are set to have an appropriate size with which desired vibration properties of the movable plate 120 are acquired. The weight portion 125 is formed by, for example, processing the supporting layer forming the support portion 114 into a predetermined shape.

As shown in FIGS. 2 and 4, the movable plate 120 is connected to the base portion 115 via a plurality of (four in this example) bridge portions 13x and 13y. The bridge portions 13x and 13y are each provided between the blade portions 121 to 124 and are formed by processing the active layer forming the main surface portion 111 into a predetermined shape.

The bridge portions 13x and 13y elastically support the center portion 120C of the movable plate 120 with respect to the base portion 115 and each have the shape symmetric with respect to the center of the movable plate 120. The bridge portion 13x includes a pair of beam portions 131x (first beam) facing each other in the x-axis direction while sandwiching the center portion 120C of the movable plate 120, and a structure 132x (first structure) that supports the pair of beam portions 131x. The bridge portion 13y includes a pair of beam portions 131y (second beam) facing each other in the y-axis direction while sandwiching the center portion 120C of the movable plate 120, and a structure 132y (second structure) that supports the pair of beam portions 131y.

The pair of beam portions 131x linearly extend in the x-axis direction and connect the base portion 115 and the movable plate 120. Similarly, the pair of beam portions 131y linearly extend in the y-axis direction and connect the base portion 115 and the movable plate 120. Each of the beam portions 131x and 131y includes a first end portion 130a connected to the movable plate 120, a second end portion 130b connected to the base portion 115, and a joint portion 130c provided between the first end portion 130a and the second end portion 130b. Each of the beam portions 131x and 131y is disposed between corresponding two of the blade portions 121 to 124 adjacent to each other.

The structure 132x is provided between each beam portion 131x and the base portion 115 and supports each beam portion 131x in a plane parallel to the main surface portion 111. Similarly, the structure 132y is provided between each beam portion 131y and the base portion 115 and supports each beam portion 131y in a plane parallel to the main surface portion 111. Each of the structures 132x and 132y is provided between the base portion 115 and the joint portion 130c.

In this embodiment, each of the structures 132x and 132y is constituted of a pair of reinforcement beams that are not parallel to the beam portions 131x and 131y. The pair of reinforcement beams extend in respective directions obliquely intersecting with the x-axis and y-axis directions and are provided in symmetric with respect to each of the beam portions 131x and 131y. In other words, the structures 132x and 132y are configured to sandwich the beam portions 131x and 131y in the xy plane, respectively.

As described above, the movable plate 120 is supported to the base portion 115 of the element main body 110 via the four bridge portions 13x and 13y and is configured to be capable of moving (movable) relative to the base portion 115 by an inertial force corresponding to the acceleration with the bridge portions 13x and 13y being set as a fulcrum.

The rigidity of the bridge portions 13x and 13y is set to have an appropriate value at which the movable plate 120 that is moving can be stably supported. In particular, the bridge portions 13x and 13y are set to have appropriate rigidity at which the bridging portions 131 to 134 can be deformed by the self-weight of the movable plate 120. The magnitude of the deformation is not particularly limited as long as it can be detected by the second acceleration detector unit 12 to be described later.

Figure 5A:
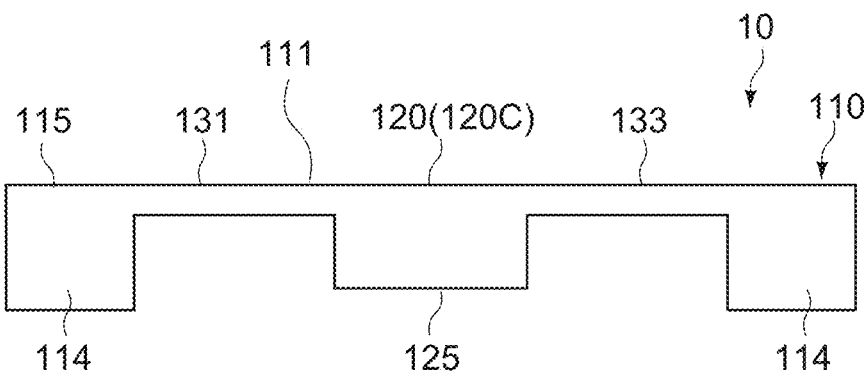
FIG. 5A is a schematic sectional side view of the acceleration sensor element, which shows a state where accelerations are not applied.
Figure 5B:
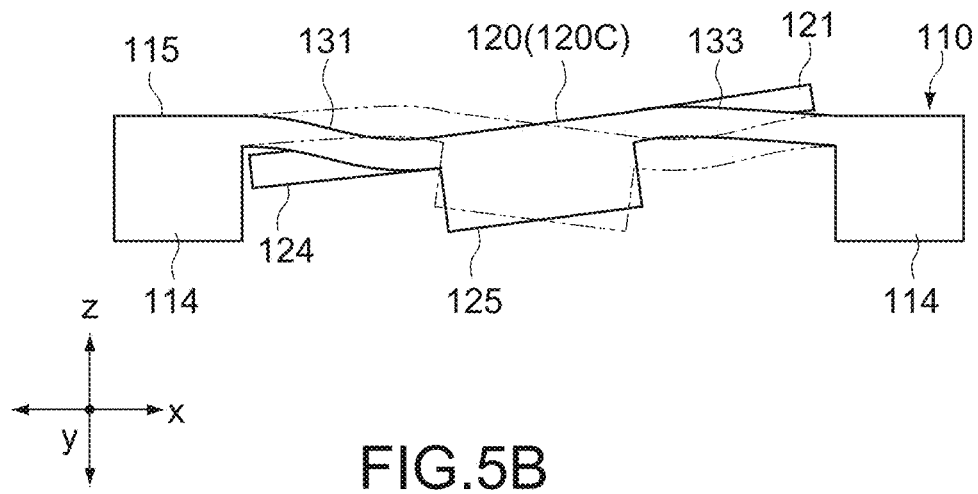
FIG. 5B is a schematic sectional side view of the acceleration sensor element, which shows a state where an acceleration along an x-axis direction occurs.
Figure 5C:
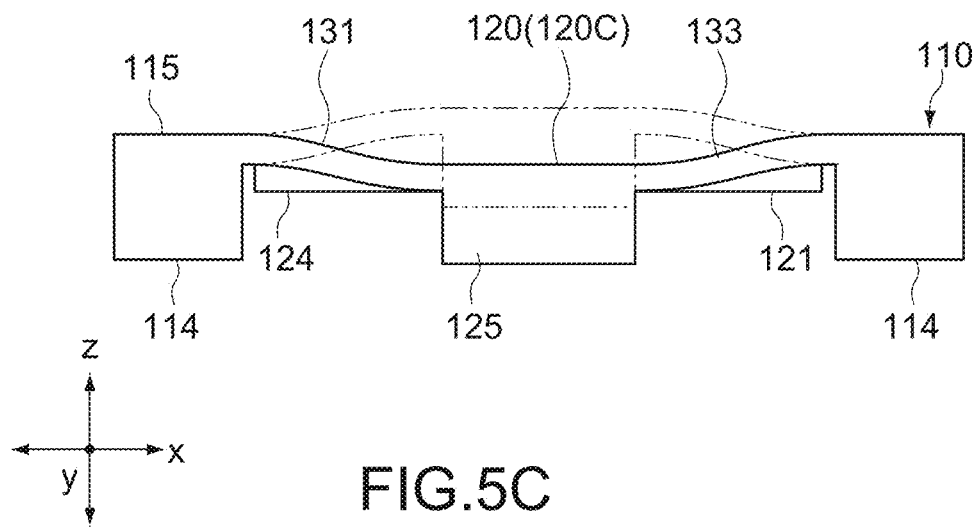
FIG. 5C is a schematic sectional side view of the acceleration sensor element, which shows a state where an acceleration along a z-axis direction occurs.

FIGS. 5A, 5B, and 5C are schematic sectional side views for describing a state of a motion of the movable plate 120, in which A shows a state where accelerations are not applied, B shows a state where the acceleration along the x-axis direction occurs, and C shows a state where the acceleration along the z-axis direction occurs. It should be noted that the solid line in FIG. 5B shows a state where the acceleration occurs in the left direction on the plane of the figure, and the solid line in FIG. 5C shows a state where the acceleration occurs in the upper direction on the plane of the figure.

When accelerations do not occur, as shown in FIGS. 2 and 5A, the movable plate 120 is maintained in a state parallel to the surface (main surface portion 111) of the base portion 115. In this state, for example, when the acceleration along the x-axis direction occurs, as shown in FIG. 5B, the movable plate 120 tilts in the counterclockwise direction about the bridge portions 13y extending in the y-axis direction. With this configuration, the bridge portions 13x facing each other in the x-axis direction each receive bending stress in the directions opposite to each other along the z-axis direction.

Similarly, when the acceleration along the y-axis direction occurs, though not shown in the figure, the movable plate 120 tilts in the counterclockwise direction (or clockwise direction) about the bridge portions 13x extending in the x-axis direction. The bridge portions 13y facing each other in the y-axis direction each receive bending stress in the directions opposite to each other along the z-axis direction.

Meanwhile, when the acceleration along the z-axis direction occurs, as shown in FIG. 5C, the movable plate 120 rises and falls with respect to the base portion 115, and the bridge portions 13x and 13y each receive bending stress in an identical direction along the z-axis direction.

The first acceleration detector unit 11 and the second acceleration detector unit 12 are provided to each of the bridge portions 13x and 13y (beam portions 131x and 131y). The inertial sensor 1 detects the deformation resulting from the bending stress of the bridge portions 13x and 13y by the acceleration detector units 11 and 12, and thus measures the direction and magnitude of the acceleration that acts on the acceleration sensor element 10.

In this embodiment, since the bridge portions 13x and 13y respectively include the structures 132x and 132y that support the beam portions 131x and 131y in a plane parallel to the main surface portion 111, and the structures 132x and 132y are joined to substantially intermediate positions of the beam portions 131x and 131y, the torsional rigidity is increased while the flexural rigidity of the beam portions 131x and 131y in the plane parallel to the main surface portion 111 is kept soft (low). With this configuration, an unintended posture of the movable plate 120 that moves by reception of an acceleration in an uniaxial direction is restricted, and thus it is possible to suppress the generation of the sensitivity along other axes and ensure the detection accuracy of a desired acceleration.

For example, when the acceleration along the x-axis direction occurs, the bridge portion 13x tolerates flexural deformation of the beam portion 131x, whereas the bridge portion 13y restricts torsional deformation of the beam portion 131y. Therefore, in the detection signal of the acceleration along the x-axis direction, the output of the acceleration detector unit 11 on the beam portion 131x becomes dominant, and the acceleration detection signal in the y-axis direction is not output when the acceleration in the x-axis direction is detected. Thus, the detection accuracy of the acceleration in the x-axis direction is improved. Similarly, when the acceleration along the y-axis direction occurs, the acceleration detection signal in the x-axis direction is not output, and thus the detection accuracy of the acceleration in the y-axis direction is improved.

Hereinafter, details of the acceleration detector units 11 and 12 will be described.

As shown in FIG. 4, the first acceleration detector unit 11 includes a plurality of (four in this example) first detection elements 11x1, 11x2, 11y1, and 11y2.

The detection elements 11x1 and 11x2 are provided on the axial centers of the respective surfaces of the two beam portions 131x facing each other in the x-axis direction. In this embodiment, the detection elements 11x1 and 11x2 are each disposed in a region (hereinafter, also referred to as first region) between the first end portion 130a and the joint portion 130c in the beam portion 131x.

Similarly, the detection elements 11y1 and 11y2 are provided on the axial centers of the respective surfaces of the two beam portions 131y facing each other in the y-axis direction. In this embodiment, the detection elements 11y1 and 11y2 are each disposed in a region (hereinafter, also referred to as first region) between the first end portion 130a and the joint portion 130c in the beam portion 131y.

The first detection elements 11x1 to 11y2 each have an identical configuration and, in this embodiment, are each constituted of a rectangular piezoelectric detection element having a long side in the axial direction of each of the beam portions 131x and 131y. The first detection elements 11x1 to 11y2 are each constituted of a laminate including a lower electrode layer, a piezoelectric film, and an upper electrode layer.

The piezoelectric film is typically made of piezoelectric zirconate titanate (PZT), but the present technology is not limited thereto as a matter of course. The piezoelectric film causes a potential difference, which corresponds to the amount of flexural deformation (stress) of each of the beam portions 131x and 131y in the z-axis direction, between the upper electrode layer and the lower electrode layer (piezoelectric effect). The upper electrode layer is electrically connected to each of the relay terminals 140 provided to the surface of the base portion 115 via a wiring layer (not shown in the figure) formed on each of the beam portions 131x and 131y. The relay terminal 140 may be configured as an external connection terminal electrically connected to the support substrate described above. For example, a bonding wire, one terminal of which is connected to the support substrate described above, is connected to the relay terminal 140 at the other terminal thereof. The lower electrode layer is typically connected to a reference potential such as a ground potential.

Since the first acceleration detector unit 11 configured as described above performs output only when the stress changes because of the characteristics of the piezoelectric film, and does not perform output in a state where a stress value is not changed even if the stress is applied, the first acceleration detector unit 11 mainly detects the magnitude of the dynamic acceleration (motion acceleration) that acts on the movable plate 120. Therefore, the output of the first acceleration detector unit 11 (first detection signal) mainly includes an output signal having an alternating-current waveform that is a dynamic component (AC component) corresponding to the motion acceleration.

Meanwhile, as shown in FIG. 4, the second acceleration detector unit 12 includes a plurality of (four in this example) second detection elements 12x1, 12x2, 12y1, and 12y2.

The detection elements 12x1 and 12x2 are provided on the axial centers of the respective surfaces of the two beam portions 131x facing each other in the x-axis direction. In this embodiment, the detection elements 12x1 and 12x2 are each disposed in a region (hereinafter, also referred to as second region) between the second end portion 130b and the joint portion 130c in the beam portion 131x.

Similarly, the detection elements 12y1 and 12y2 are provided on the axial centers of the respective surfaces of the two beam portions 131y facing each other in the y-axis direction. In this embodiment, the detection elements 12y1 and 12y2 are each disposed in a region (hereinafter, also referred to as second region) between the second end portion 130b and the joint portion 130c in the beam portion 131y.

The second detection elements 12x1 to 12y2 each have an identical configuration and, in this embodiment, are each constituted of a piezoresistive detection element having a long side in the axial direction of each of the beam portions 131x and 131y. The second detection elements 12x1 to 12y2 each include a resistive layer and a pair of terminal portions connected to both ends of the resistive layer in the axial direction.

The resistive layer is constituted of a conductor layer that is formed by, for example, doping an impurity element in the surface (silicon layer) of the second region of each of the beam portions 131x and 131y. The resistive layer causes a resistance change, which corresponds to the amount of flexural deformation (stress) of each of the beam portions 131x and 131y in the z-axis direction, between the pair of terminal portions (piezoresistive effect). The pair of terminal portions is electrically connected to each of the relay terminals 140 provided to the surface of the base portion 115 via a wiring layer (not shown in the figure) formed on the bridge portions 13x and 13y.

Since the second acceleration detector unit 12 configured as described above has a resistance value determined by an absolute stress value because of the piezoresistive characteristics, the second acceleration detector unit 12 detects not only the dynamic acceleration (motion acceleration) that acts on the movable plate 120 but also the static acceleration (gravitational acceleration) that acts on the movable plate 120. Therefore, the output of the second acceleration detector unit 11 (second detection signal) has an output waveform in which a dynamic component (AC component) corresponding to the motion acceleration is superimposed on a gravitational acceleration or a static component (DC component) corresponding to the gravitational acceleration.

It should be noted that the second detection elements $12x1$ to $12y2$ are not limited to the example in which the second detection elements $12x1$ to $12y2$ are each constituted of the piezoresistive detection element, and may be each constituted of other non-piezoelectric detection element capable of detecting the acceleration of the DC component, for example, like an electrostatic type. In a case of the electrostatic type, a movable electrode portion and a fixed electrode portion constituting an electrode pair are disposed to face each other in the axial direction of each of the beam portions $131x$ and $131y$ and are configured such that a facing distance between the electrode portions changes depending on the amounts of flexural deformation of each of the beam portions $131x$ and $131y$.

The first acceleration detector unit 11 outputs each of the acceleration detection signals in the respective x-axis direction, y-axis direction, and z-axis direction (Acc-AC-x, Acc-AC-y, Acc-AC-z) to the controller 20 on the basis of the outputs of the first detection elements $11x1$ to $11y2$ (see FIG. 1).

The acceleration detection signal in the x-axis direction (Acc-AC-x) corresponds to a difference signal (ax1−ax2) between the output of the detection element $11x1$ (ax1) and the output of the detection element $11x2$ (ax2). The acceleration detection signal in the y-axis direction (Acc-AC-y) corresponds to a difference signal (ay1−ay2) between the output of the detection element $11y1$ (ay1) and the output of the detection element $11y2$ (ay2). Additionally, the acceleration detection signal in the z-axis direction (Acc-AC-z) corresponds to the sum of the outputs of the detection elements $11x1$ to $11y2$ (ax1+ax2+ay1+ay2).

Similarly, the second acceleration detector unit 12 outputs each of the acceleration detection signals in the respective x-axis direction, y-axis direction, and z-axis direction (Acc-DC-x, Acc-DC-y, Acc-DC-z) to the controller 20 on the basis of the outputs of the second detection elements $12x1$ to $12y2$ (see FIG. 1).

The acceleration detection signal in the x-axis direction (Acc-DC-x) corresponds to a difference signal (bx1−bx2) between the output of the detection element $12x1$ (bx1) and the output of the detection element $12x2$ (bx2). The acceleration detection signal in the y-axis direction (Acc-DC-y) corresponds to a difference signal (by1−by2) between the output of the detection element $12y1$ (by1) and the output of the detection element $12y2$ (by2). Additionally, the acceleration detection signal in the z-axis direction (Acc-DC-z) corresponds to the sum of the outputs of the detection elements $12x1$ to $12y2$ (bx1+bx2+by1+by2).

The arithmetic processing of the acceleration detection signals in the respective axial directions described above may be executed at a previous stage of the controller 20 or may be executed in the controller 20.

Figure 6A:
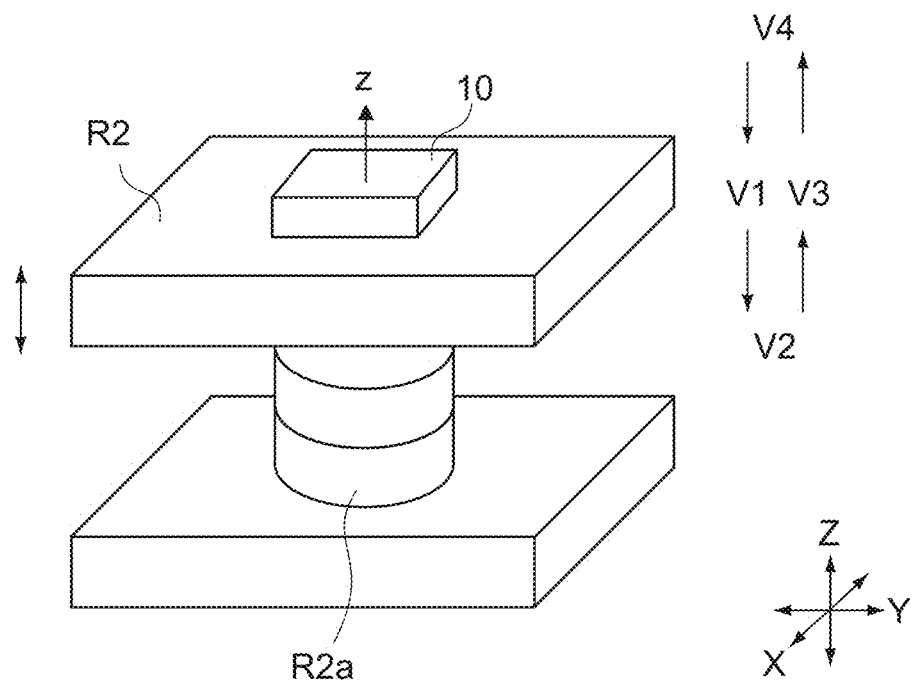
FIG. 6A is a perspective view schematically showing a configuration of an apparatus that measures acceleration detection characteristics of the acceleration sensor element.
Figure 6B:
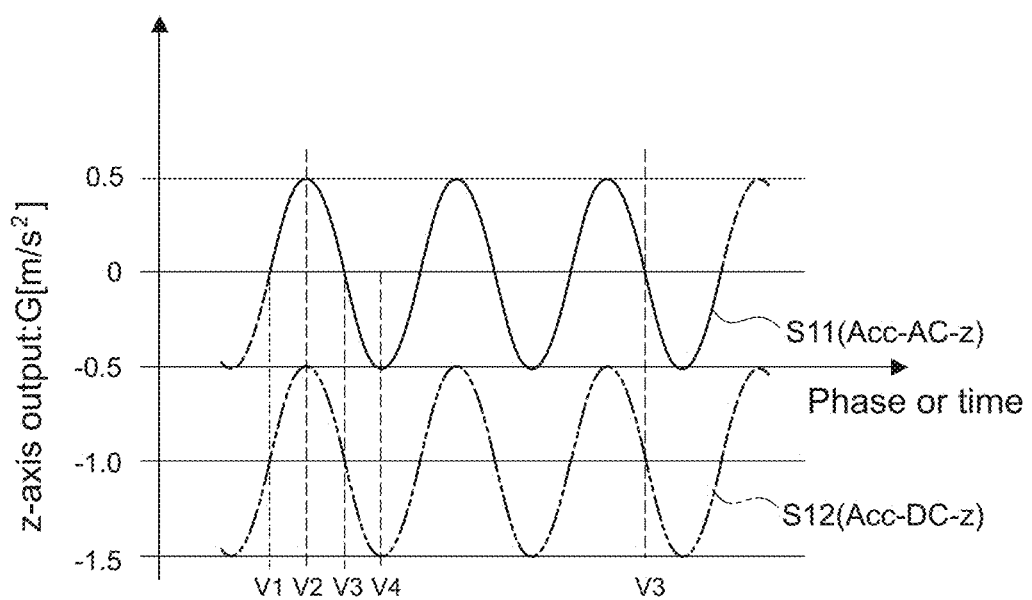
FIG. 6B is a diagram showing an example of acceleration detection characteristics measured by using the apparatus.

For example, FIG. 6B shows an example of an output waveform in the z-direction detection axis of the acceleration sensor element 10 (first and second acceleration detector units 11 and 12) attached to, as shown in FIG. 6A, a vibration table R2 including a vibrator unit R2a that expands and contracts in the X-axis direction.

The acceleration sensor element 10 is attached to the upper surface of the vibrating body R2, which is parallel to the XY-plane, such that the z-direction detection axis is directed upward. Here, the upward direction in the figure is set as a gravity direction (see FIG. 6A). FIG. 6B shows each of a detection signal S11 output from the first acceleration detector unit 11 and a temporal change in detection signal S12 output from the second acceleration detector unit 12, when the vibration table R2 is vibrated in the up-and-down direction. It should be noted that the vibration frequency of the vibration table R2 is set to an appropriate frequency (e.g., 1 Hz) at which the first acceleration detector unit 11 in the piezoelectric method can detect an acceleration.

Along with the vibration of the vibration table R2, the magnitude of the weight acceleration that acts on the z axis of the acceleration sensor element 10 periodically changes. In the first acceleration detector unit 11 in the piezoelectric method, the magnitude of the output varies depending on a vibration position of the vibration table (positions V1 to V4 in FIG. 6A), and the output becomes maximum at the bottom dead point (V2) and the top dead point (V4) of the vibration table R2. In the detection signal S11 (Acc-AC-z), a dynamic acceleration with a 1 G width (−0.5 G to 0.5 G) is detected in the example shown in the figure. In other words, the first acceleration detector unit 11 outputs the detection signal S11 having an alternating-current waveform corresponding to the vibration acceleration.

Meanwhile, also in the second acceleration detector unit 12 including the piezoresistive detection elements, similarly, the magnitude of the output varies depending on a vibration position of the vibration table, and the output becomes maximum at the bottom dead point (V2) and the top dead point (V4) of the vibration table R2. However, since the second acceleration detector unit 12 also detects a gravitational acceleration that is the static acceleration component at the same time, in the detection signal S12 (Acc-DC-z), a dynamic acceleration with a 1 G width (−1.5 G to −0.5 G) in which a base line is at −1 G is detected (see FIG. 6B). In other words, the second acceleration detector unit 12 outputs the detection signal S12 having an output waveform in which an alternating-current component corresponding to the vibration acceleration is superimposed on a DC component (−1 G in this example).

As described above, the first acceleration detector unit 11 of the piezoelectric type can detect a net motion acceleration (AC component) without the influence of the static acceleration component (DC component) such as a gravitational acceleration, but has the property in which sensitivity in a predetermined low-frequency range is reduced.

On the other hand, the second acceleration detector unit 12 of the piezoresistive type has an output waveform in which the motion acceleration of the detection target is superimposed on the gravity component, and thus has the property in which the separation from the gravitational acceleration is difficult to perform but constant output sensitivity can be obtained also in the low-frequency range.

Furthermore, in this embodiment, since the first detection elements $11x1$ to $11y2$ constituting the first acceleration detector unit 11 are disposed in the first regions on the beam portions $131x$ and $131y$, the amount of flexural deformation is larger than that in the second regions on the beam portions $131x$ and $131y$, and thus the sensitivity is high. Meanwhile, since the second detection elements $12x1$ to $12y2$ constituting the second acceleration detector unit 12 are disposed in the second regions on the beam portions $131x$ and $131y$, and thus the second detection elements $12x1$ to $12y2$ are less likely to be affected by the influence of the sensitivity along other axes than in the first regions and the detection accuracy is high. In this regard, if the output of the first acceleration detector unit 11 is corrected by the output of the second acceleration detector unit 12, acceleration detection characteristics with high sensitivity and high accuracy can be achieved.

Next, the inertial sensor 1 of this embodiment includes the controller 20 capable of extracting the dynamic acceleration components and the static acceleration components from the accelerations that act on the acceleration sensor element 10, on the basis of those two detection signals S11 and S12. Hereinafter, details of the controller 20 will be described.

(Controller)

The controller 20 is electrically connected to the acceleration sensor element 10. The controller 20 may be mounted inside a device together with the acceleration sensor element 10 or may be mounted in an external device different from the above-mentioned device. In the former case, for example, the controller 20 may be mounted on a circuit board on which the acceleration sensor element 10 is to be mounted or may be mounted on a substrate different from the above-mentioned circuit board via a wiring cable or the like. In the latter case, for example, the controller 20 is configured to be communicable with the acceleration sensor element 10 wirelessly or wiredly.

As shown in FIG. 1, the controller 20 includes the acceleration arithmetic unit 200, a serial interface 201, a parallel interface 202, and an analog interface 203. The controller 20 is electrically connected to controller units of various devices that receive the output of the inertial sensor 1.

The acceleration arithmetic unit 200 extracts each of dynamic acceleration components (Acc-x, Acc-y, Acc-z) and static acceleration components (Gr-x, Gr-y, Gr-z) on the basis of the acceleration detection signals in the respective axial directions, which are output from the first acceleration detector unit 11 and the second acceleration detector unit 12.

It should be noted that the acceleration arithmetic unit 200 is achieved by loading a program, which is recorded in a ROM as an example of a non-transitory computer readable recording medium, to a RAM or the like and executing the program by the CPU.

The serial interface 201 is configured to be capable of sequentially outputting the dynamic acceleration components and the static acceleration components in the respective axes, which are generated in the acceleration arithmetic unit 200, to the controller units described above. The parallel interface 202 is configured to be capable of outputting the dynamic and static acceleration components in the respective axes, which are generated in the acceleration arithmetic unit 200, to the controller units described above in parallel. The controller 20 may include at least one of the serial interface 201 or the parallel interface 202 or may selectively switch the interface depending on commands from the controller units described above. The analog interface 203 is configured to be capable of outputting the outputs of the first and second acceleration detector units 11 and 12 to the controller units described above without change, but it may be omitted as necessary. It should be noted that FIG. 1 shows converters 201 that analog-digital (AD) convert the acceleration detection signals in the respective axes and are denoted by reference number 204.

Figure 7:
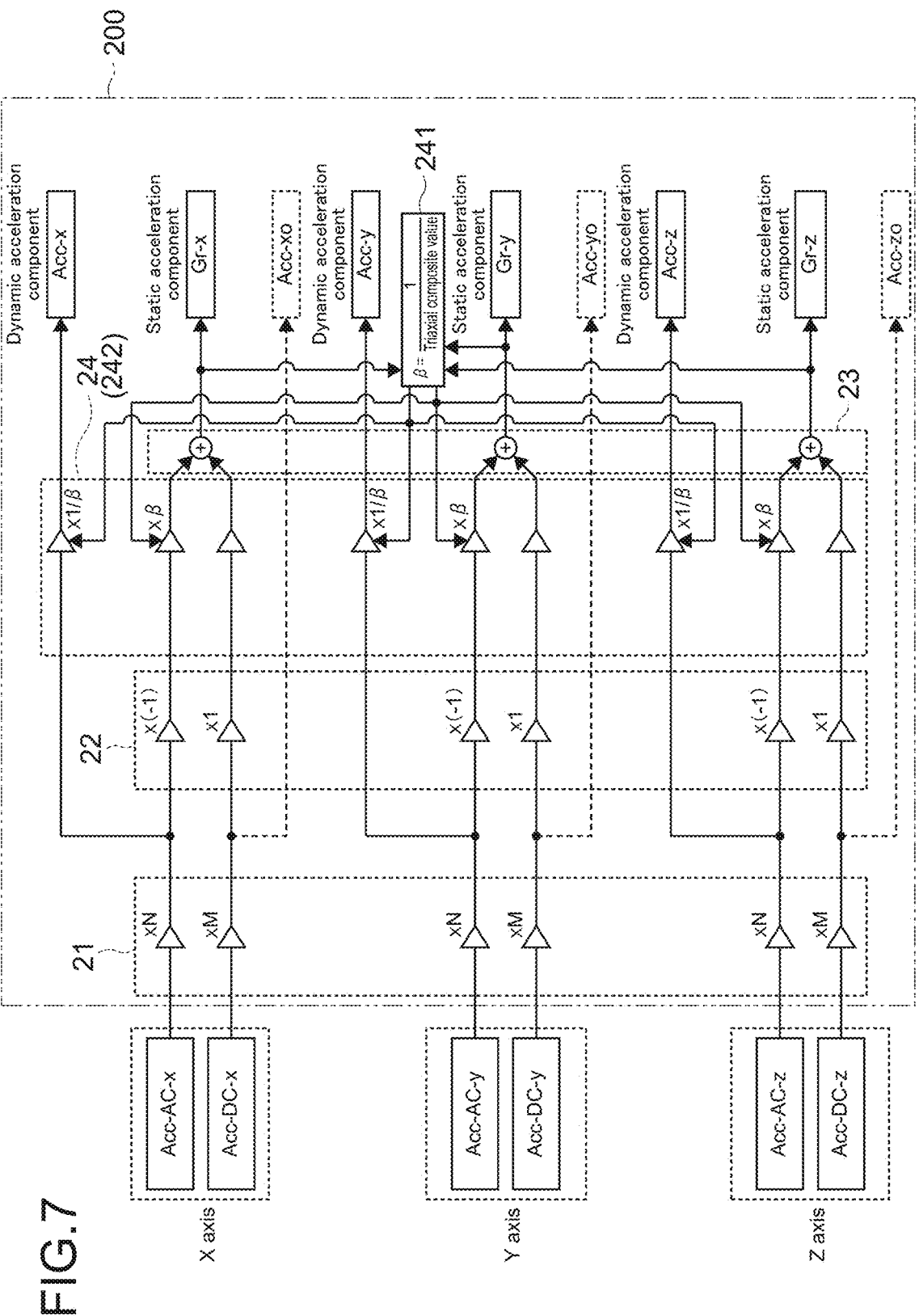
FIG. 7 is a circuit diagram showing a configuration example of an acceleration arithmetic unit in the inertial sensor.

FIG. 7 is a circuit diagram showing a configuration example of the acceleration arithmetic unit 200.

The acceleration arithmetic unit 200 includes a gain adjustment circuit 21, a sign inversion circuit 22, an adder circuit 23, and a correction circuit 24. Those circuits 21 to 24 have a common configuration for each of the x, y, and z axes. The arithmetic processing in common with the respective axes is performed, and the dynamic acceleration components (motion accelerations) and the static acceleration components (gravitational accelerations) in the respective axes are thus extracted.

Figure 8:
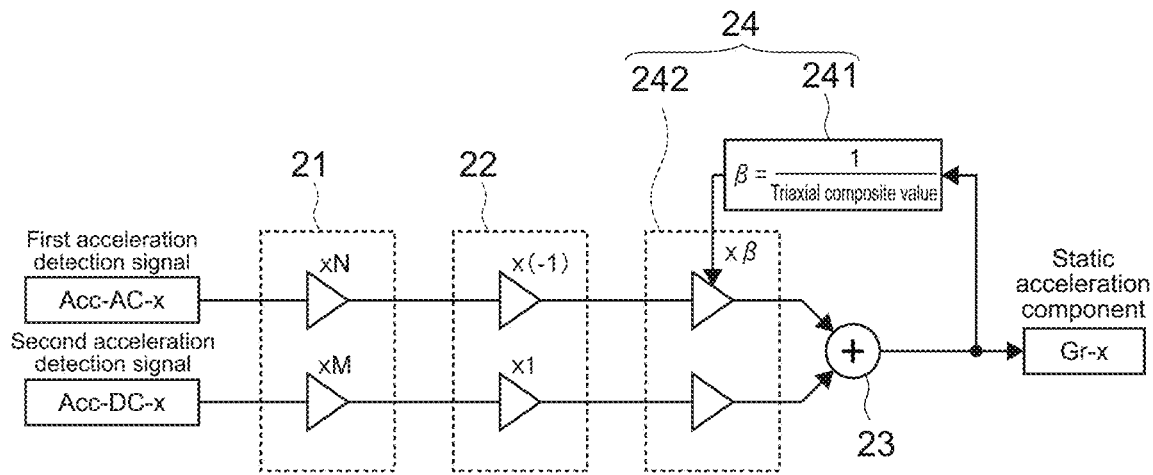
FIG. 8 is a diagram showing a processing block for a one-axis direction in the acceleration arithmetic unit.

Hereinafter, representatively, a processing circuit of the acceleration detection signal in the x-axis direction will be described as an example. FIG. 8 shows a processing block that extracts the static acceleration component from the acceleration detection signal in the x-axis direction.

The gain adjustment circuit 21 adjusts gain of each signal such that a first acceleration detection signal (Acc-AC-x) regarding the x-axis direction, which is output from the first acceleration detector unit 11 (first detection elements 11$x$1, 11$x$2), and a second acceleration detection signal (Acc-DC-x) regarding x-axis direction, which is output from the second acceleration detector unit 12 (second detection elements 12$x$1, 12$x$2), have a level identical to each other. The gain adjustment circuit 21 includes an amplifier that amplifies the output of the first acceleration detector unit 11 (Acc-AC-x) and the output of the second acceleration detector unit 12 (Acc-DC-x).

Figure 9:
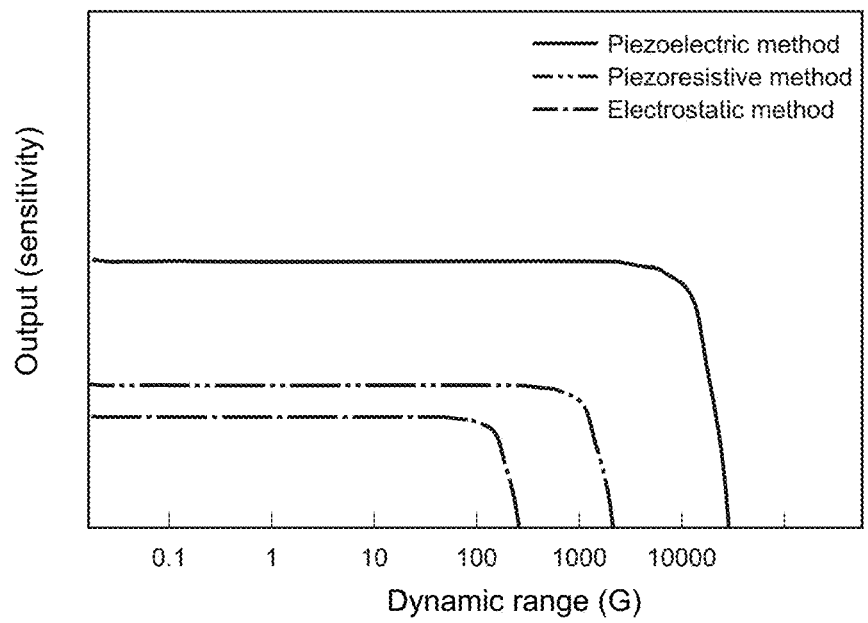
FIG. 9 is a diagram for describing output characteristics of a plurality of acceleration sensors in different detection methods.

In general, the output sensitivity and the dynamic range of an acceleration sensor are different depending on a detection method. For example, as shown in FIG. 9, an acceleration sensor in a piezoelectric method has higher output sensitivity and a wider (larger) dynamic range than those of acceleration sensors in a non-piezoelectric method (piezoresistive method, electrostatic method). In this embodiment, the first acceleration detector unit 11 corresponds to an acceleration sensor in a piezoelectric method, and the second acceleration detector unit 12 corresponds to an acceleration sensor in a piezoresistive method.

In this regard, the gain adjustment circuit 21 amplifies the outputs of the acceleration detector units 11 and (first and second acceleration detection signals) by N times and M times, respectively, such that the outputs of those acceleration detector units 11 and 12 have the identical level. The amplification factors N and M are positive numbers and satisfy a relationship where N<M. The values of the amplification factors N and M are not particularly limited and may be set as coefficients that also serve for the temperature compensation of the respective acceleration detector units 11 and 12, depending on an environment of usage (service temperature) of the inertial sensor 1.

Figure 10:
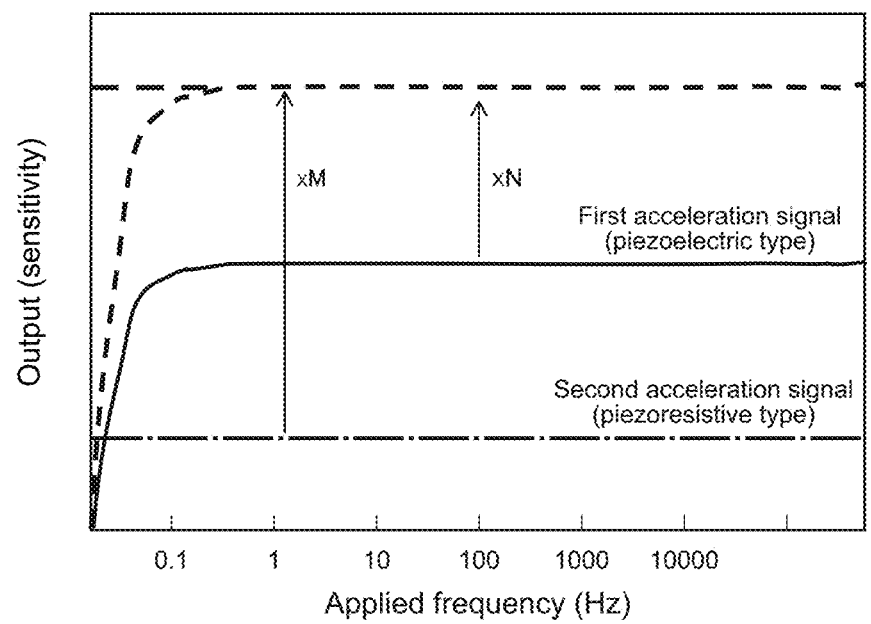
FIG. 10 is a diagram for describing an action of the acceleration arithmetic unit.

FIG. 10 shows an example of the output characteristics of the first acceleration detection signal and the second acceleration detection signal in comparison between the output characteristics before the gain adjustment and the output characteristics after the gain adjustment. In the figure, the horizontal axis represents the frequency of the acceleration that acts on the inertial sensor 1, and the vertical axis represents the output (sensitivity) (the same holds true for FIGS. 11 to 15).

As shown in the figure, in the first acceleration detection signal (Acc-AC-x) in the piezoelectric method, the output sensitivity of the acceleration components in the low-frequency range equal to or smaller than 0.5 Hz is lower than the output sensitivity of the acceleration components in the frequency range higher than the former range, and in particular, the output sensitivity in a static state (motion acceleration is zero) is substantially zero. In contrast to this, the second acceleration detection signal (Acc-DC-x) in the piezoresistive method has constant output sensitivity in the entire frequency range, and thus the acceleration component in the static state (i.e., static acceleration component) can also be detected at constant output sensitivity. Therefore, when the first acceleration detection signal and the second acceleration detection signal are amplified by respective predetermined multiplying factors in the gain adjustment circuit 21 so as to have a level identical to each other, the static acceleration component can be extracted in a difference arithmetic circuit to be described later.

The sign inversion circuit 22 and the adder circuit 23 constitute the difference arithmetic circuit that extracts the static acceleration component (DC component) from the acceleration in each axial direction on the basis of a difference signal between the first acceleration detection signal (Acc-AC-x) and the second acceleration detection signal (Acc-DC-x).

Figure 11:
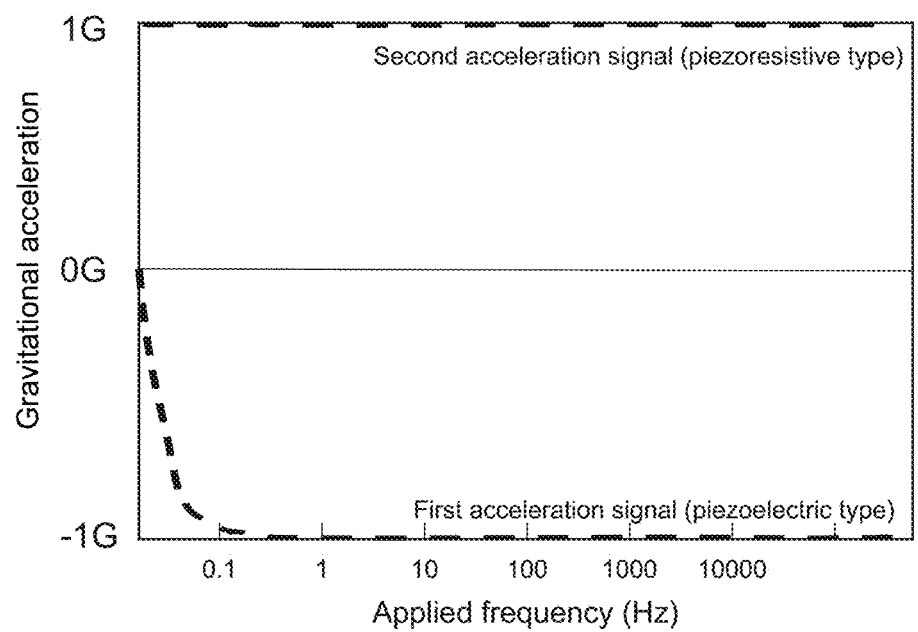
FIG. 11 is a diagram for describing an action of the acceleration arithmetic unit.

The sign inversion circuit 22 includes an inverting amplifier (amplification factor: −1) that inverts the sign of the first acceleration detection signal (Acc-AC-x) after the gain adjustment. FIG. 11 shows an example of the output characteristics of the first acceleration detection signal (Acc-AC-x) after the sign inversion. Here, a case where the acceleration sensor element 10 detects a 1G-acceleration in the x-axis direction is shown as an example.

It should be noted that the second acceleration detection signal (Acc-DC-x) is output to the adder circuit 23 as a subsequent stage, without inverting the sign thereof. The sign inversion circuit 22 may be configured in common with the gain adjustment circuit 21 at the previous stage thereof.

Figure 12:
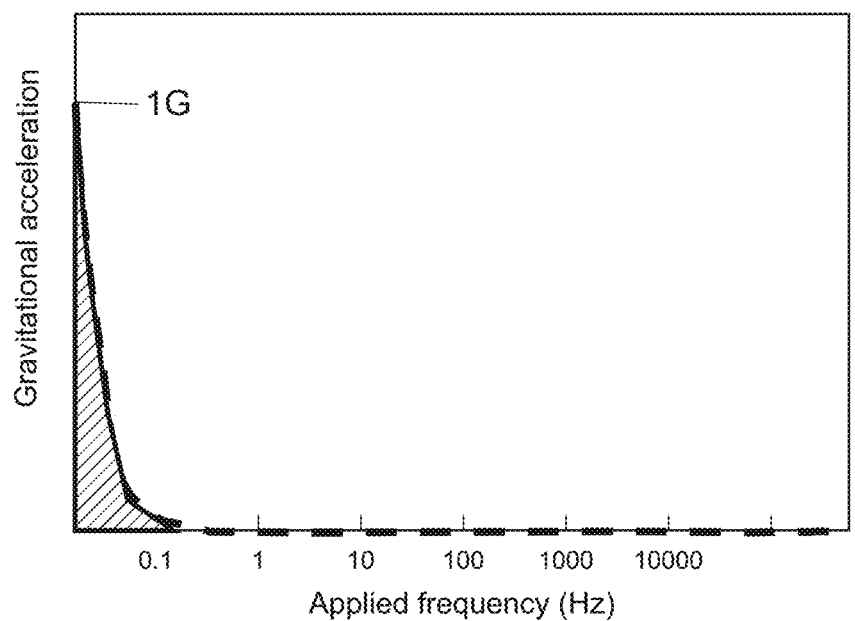
FIG. 12 is a diagram for describing an action of the acceleration arithmetic unit.

The adder circuit 23 adds the first acceleration detection signal (Acc-AC-x) and the second acceleration detection signal (Acc-DC-x), which are output from the sign inversion circuit 22, and outputs a static acceleration component. FIG. 12 shows an example of the output characteristics of the adder circuit 23. Since the first and second acceleration detection signals (outputs) are adjusted to have the identical level in the gain adjustment circuit 21, when a difference signal between those signals is obtained, a net static acceleration component (Gr-x) is extracted. The static acceleration component typically corresponds to a gravitational acceleration component or an acceleration component including a gravitational acceleration.

Figure 13:
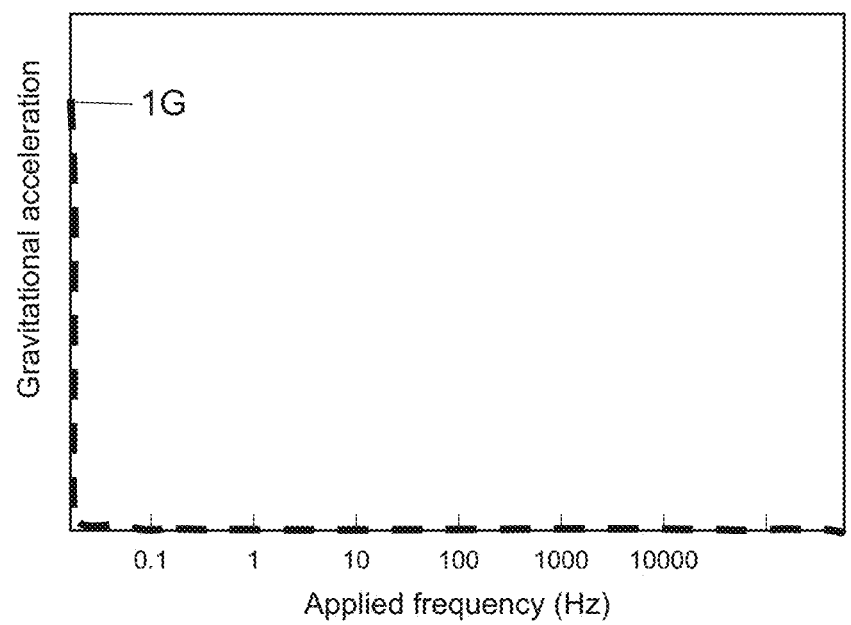
FIG. 13 is a diagram for describing an action of the acceleration arithmetic unit.

In a case where the static acceleration component output from the adder circuit 23 is only the gravitational acceleration, in theory, the output of a significant acceleration component appears only in the vicinity of 0 Hz as shown in FIG. 13. However, in reality, because of the low detection sensitivity in the vicinity of low frequencies of the piezoelectric-detection-type first acceleration detector unit 11, inevitable superimposition of acceleration components in axial directions (here, y-axis direction and z-axis direction) other than the target axis due to the occurrence of the sensitivity along other axes, or the like, the dynamic acceleration component in the frequency range hatched in FIG. 12 leaks into the output of the adder circuit 23 as an error component. In this regard, this embodiment includes the correction circuit 24 for cancelling the error on the basis of the output of the adder circuit 23.

The correction circuit 24 includes a triaxial-composite-value arithmetic unit 241 and a low-frequency sensitivity correction unit 242. The correction circuit 24 calculates a correction coefficient β on the basis of the output of the adder circuit 23 (difference signal between first and second acceleration detection signals) and corrects the first acceleration detection signal (Acc-AC-x) by using the correction coefficient β.

The triaxial-composite-value arithmetic unit 241 is provided in common for the processing blocks that extract the static acceleration components in all the x-axis, y-axis, and z-axis directions, and calculates the correction coefficient β by using the total value of the outputs (difference signals between first and second acceleration detection signals) of the adder circuits 23 in the respective axes.

Specifically, the triaxial-composite-value arithmetic unit 241 calculates a composite value ($\sqrt{((Gr\text{-}x)^2+(Gr\text{-}y)^2+(Gr\text{-}z)^2)}$) of the static acceleration components in the three-axis directions (Gr-x, Gr-y, Gr-z), and while considering a portion exceeding 1 in the composite value as a low-frequency sensitivity error (range hatched in FIG. 12), calculates the correction coefficient β corresponding to the inverse of the composite value described above.

$$\beta=1/(\sqrt{((Gr\text{-}x)^2+(Gr\text{-}y)^2+(Gr\text{-}z)^2)})$$

It should be noted that the values of the static acceleration components in the respective three-axis directions (Gr-x, Gr-y, Gr-z) differ depending on the posture of the acceleration sensor element 10 and further vary from hour to hour according to a change in posture of the acceleration sensor element 10. For example, in a case where the z-axis direction of the acceleration sensor element 10 coincides with the gravity direction (vertical direction), the static acceleration component (Gr-z) in the z-axis direction has a large value as compared to the static acceleration components (Gr-x, Gr-y) in the x-axis direction and the y-axis direction. In such a manner, the gravity direction of the acceleration sensor element 10 at that point of time can be estimated from the values of the static acceleration components (Gr-x, Gr-y, Gr-z) in the respective three-axis directions.

The low-frequency sensitivity correction unit 242 includes a multiplier that multiplies the first acceleration detection signal (Acc-AC-x) having the inverted sign by the correction coefficient β. With this configuration, the first acceleration detection signal is input to the adder circuit 23 in a state where a low-frequency sensitivity error is reduced, and thus an acceleration signal having the frequency characteristics as shown in FIG. 13 is output from the adder circuit 23. In such a manner, only the static acceleration component corresponding to the gravitational acceleration is output, with the result that the extraction accuracy of the gravitational acceleration component is improved.

In this embodiment, the correction circuit 24 is configured to execute processing of multiplying the first acceleration detection signal by the correction coefficient β when the static acceleration component is calculated, but the present technology is not limited thereto. The correction circuit 24 may be configured to execute processing of multiplying the second acceleration detection signal (Acc-DC-x) by the correction coefficient β or may be configured to switch an acceleration detection signal to be corrected between the first acceleration detection signal and the second acceleration detection signal according to the magnitude of an acceleration change.

In a case where either one of the first acceleration detection signal and the second acceleration detection signal has a predetermined acceleration change or larger, the correction circuit 24 is configured to correct the first acceleration detection signal by using the correction coefficient β. As the acceleration change becomes larger (as a frequency to be applied becomes higher), a proportion at which the error component leaks into the first acceleration detection signal increases, and thus the error component can be effectively reduced. This configuration is particularly effective in a case where the motion acceleration is relatively large, for example, as in a motion analysis application.

Meanwhile, in a case where either one of the first acceleration detection signal and the second acceleration detection signal has a predetermined acceleration change or smaller, the correction circuit 24 is configured to correct the second acceleration detection signal by using the correction coefficient β. As the acceleration change becomes smaller (as a frequency to be applied becomes lower), a proportion at which the error component leaks into the second acceleration detection signal increases, and thus the error component can be effectively reduced. This configuration is particularly effective in a case where the motion acceleration is relatively small, for example, as in a leveling operation of a digital camera.

While the static acceleration components in the respective axial directions are extracted as described above, in order to extract the dynamic acceleration components in the respective axial directions (Acc-x, Acc-y, Acc-z), the first acceleration detection signals (Acc-AC-x, Acc-AC-y, Acc-AC-z), in each of which gain is adjusted in the gain adjustment circuit 21, are referred to as shown in FIG. 7.

Here, the first acceleration detection signal may be used to extract the dynamic acceleration component as it is. However, since there is a case where part of the dynamic acceleration component leaks into the static acceleration component as described above, the dynamic acceleration component is lost and the detection with high accuracy is difficult to perform. In this regard, the first acceleration detection signal is corrected by using the correction coefficient $\beta$ calculated in the correction circuit 24, so that the detection accuracy of the dynamic acceleration component can be achieved.

Figure 14:
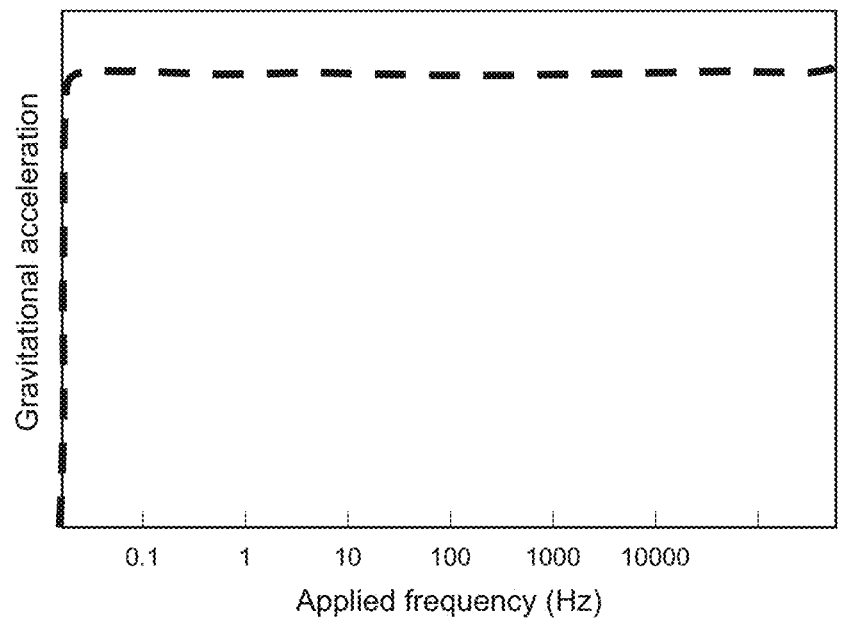
FIG. 14 is a diagram for describing an action of the acceleration arithmetic unit.
Figure 15:
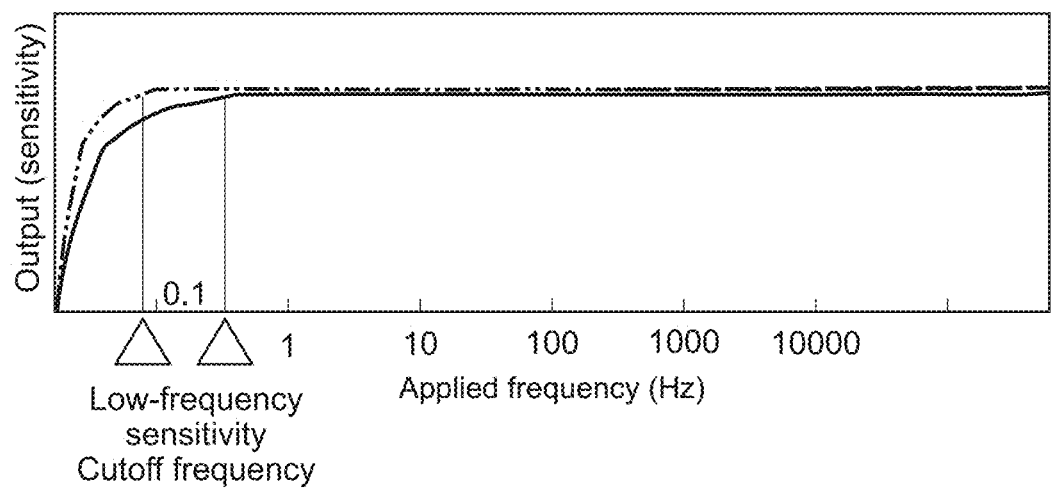
FIG. 15 is a diagram for describing an action of the acceleration arithmetic unit.
Figure 6:
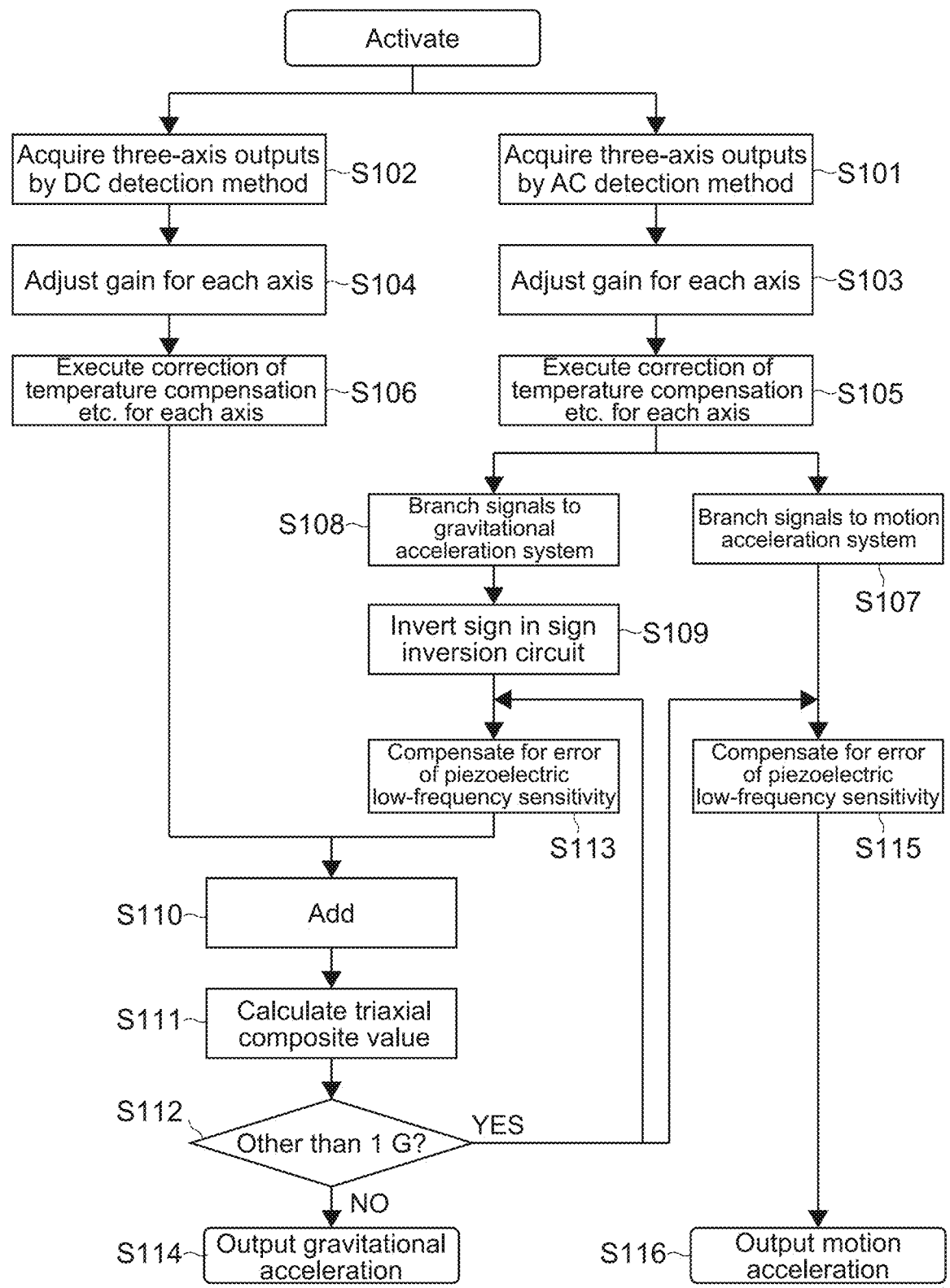

More specifically, as shown in FIG. 7, the correction circuit 24 (low-frequency sensitivity correction unit 242) includes a multiplier that multiplies the first acceleration signals (Acc-AC-x, Acc-AC-y, Acc-AC-z) by the inverse ($1/\beta$) of the correction coefficient $\beta$, which is acquired by the triaxial-composite-value arithmetic unit 241. With this configuration, low-frequency sensitivity components of the first acceleration signals are compensated, and thus the extraction accuracy of the dynamic acceleration components (Acc-x, Acc-y, Acc-z) is improved. FIG. 14 schematically shows the output characteristics of the dynamic acceleration components.

In this embodiment, the correction circuit 24 is configured to execute processing of multiplying the first acceleration detection signal by the inverse ($1/\beta$) of the correction coefficient when the dynamic acceleration component is calculated, but the present technology is not limited thereto. The correction circuit 24 may be configured to execute processing of multiplying the second acceleration detection signals (Acc-DC-x, Acc-DC-y, Acc-DC-z) by the inverse ($1/\beta$) of the correction coefficient. Alternatively, the correction circuit 24 may be configured to switch an acceleration detection signal to be corrected between the first acceleration detection signal and the second acceleration detection signal according to the magnitude of an acceleration change, as in the case of the above-mentioned calculation technique for the static acceleration components.

The processing of correcting the dynamic acceleration component and the static acceleration component by the low-frequency sensitivity correction unit 242 is typically effective in a case where a composite value calculated in the triaxial-composite-value arithmetic unit 241 is other than 1 G (G: gravitational acceleration). It should be noted that examples of the case where the composite value described above is less than 1 G include a case where the acceleration sensor element 10 is in free fall.

It should be noted that the first acceleration detection signal detected by the piezoelectric method has output characteristics like a high-pass filter (HPF), and the output lower than a cutoff frequency thereof remains in the output of the adder circuit 23 as an error component of the low-frequency sensitivity (see FIG. 12). In this embodiment, the error component described above is reduced by an arithmetic technique using the correction circuit 24, but the lower cutoff frequency described above is more desirable in order to enhance the accuracy of cancelling the error component.

In this regard, for example, a piezoelectric body having a relatively large capacitance and internal resistance may be used as the piezoelectric film of each of the detection elements (11x1, 11x2, 11y1, 11y2) constituting the first acceleration detector unit 11. With this configuration, for example, as indicated by a chain line in FIG. 15, the cutoff frequency of the low-frequency sensitivity can be reduced to the vicinity of 0 Hz as much as possible, so that the error component of the low-frequency sensitivity can be made as small as possible.

[Acceleration Measurement Method]

Next, an example of the method of processing the acceleration signal in the acceleration arithmetic unit 200 configured as described above will be described.

When an acceleration acts on the acceleration sensor element 10, the movable plate 120 moves according to the direction of the acceleration with respect to the base portion 115 in the states shown in FIGS. 5A, 5B, and 5C. The first acceleration detector unit 11 (detection elements 11x1, 11x2, 11y1, 11y2) and the second acceleration detector unit 12 (detection elements 12x1, 12x2, 12y1, 12y2) output detection signals corresponding to the amounts of mechanical deformation of the bridge portions 13x and 13y to the controller 20.

FIG. 16 is a flowchart showing an example of the processing procedure of the acceleration detection signal in the controller 20 (acceleration arithmetic unit 200).

The controller 20 acquires the first acceleration detection signals in the respective axes (Acc-AC-x, Acc-AC-y, Acc-AC-z) from the first acceleration detector unit 11 and receives (acquires) the second acceleration detection signals in the respective axes (Acc-DC-x, Acc-DC-y, Acc-DC-z) from the second acceleration detector unit 12 at predetermined sampling intervals (Steps 101 and 102). Those detection signals may be acquired simultaneously (in parallel) or sequentially (serially).

Sequentially, the controller 20 adjusts gain of each detection signal by the gain adjustment circuit 21 such that the first and second acceleration detection signals have an identical level for each axis (FIG. 10, Steps 103 and 104). Further, as necessary, correction for the purpose of temperature compensation or the like of the first and second acceleration detection signals is performed for each axis (Steps 105 and 106).

Next, the controller 20 branches the first acceleration detection signals in the respective axes (Acc-AC-x, Acc-AC-y, Acc-AC-z) into a dynamic acceleration calculation system (motion acceleration system) and a static acceleration calculation system (gravitational acceleration system) (Steps 107 and 108). The first acceleration detection signal branched to the static acceleration calculation system is input to the adder circuit 23 after the sign thereof is inverted by the sign inversion circuit 22 (FIG. 11, Step 109).

The controller 20 adds the first acceleration detection signals (Acc-AC-x, Acc-AC-y, Acc-AC-z) whose signs are inverted, and the second acceleration detection signals (Acc-DC-x, Acc-DC-y, Acc-DC-z), and calculates static acceleration components (Gr-x, Gr-y, Gr-z) for the respective axes in the adder circuit 23 (FIG. 12, Step 110). Furthermore, the controller 20 calculates a triaxial composite value of those static acceleration components in the triaxial-composite-value arithmetic unit 241 (Step 111) and, in a case where that value is other than 1 G, executes in the low-frequency sensitivity correction unit 242 processing of multiplying the above-mentioned first acceleration detection signals (Acc-AC-x, Acc-AC-y, Acc-AC-z) whose signs are inverted, by the correction coefficient β that is the inverse of the composite value described above (Steps 112 and 113). When the composite value described above is 1 G, the controller 20 outputs the calculated gravitational acceleration components (static acceleration components) to the outside (Step 114). It should be noted that the present technology is not limited to the above, and each time the composite value described above is calculated, the calculated gravitational acceleration components (static acceleration components) may be output to the outside.

Meanwhile, when the composite value described above is other than 1 G, the controller 20 executes the processing of multiplying the first acceleration detection signals (Acc-AC-x, Acc-AC-y, Acc-AC-z), which are branched to the motion acceleration system, by the inverse (1/β) of the calculated correction coefficient β (Steps 112 and 115). When the composite value described above is 1 G, the controller 20 outputs the calculated motion acceleration components (dynamic acceleration components) to the outside (Step 116). It should be noted that the present technology is not limited to the above, and each time the composite value described above is calculated, the calculated motion acceleration components (dynamic acceleration components) may be output to the outside.

As described above, the inertial sensor 1 in this embodiment is configured to use the difference in detection methods for the first and second acceleration detector units 11 and 12 to extract the dynamic acceleration components and the static acceleration components from those outputs. With this configuration, the motion acceleration that acts on an object (detection target of electronic apparatus or the like) can be accurately measured.

Further, according to this embodiment, since the gravitational acceleration components can be accurately extracted from the output of the inertial sensor 1, the posture of the detection target with respect to the gravity direction can be highly accurately detected. With this configuration, for example, the horizontal posture of a detection target such as a flight vehicle can be stably maintained.

Furthermore, according to this embodiment, since a piezoelectric acceleration sensor is employed as the first acceleration detector unit 11, and a non-piezoelectric (piezoresistive or electrostatic) acceleration sensor is employed as the second acceleration detector unit 12, an inertial sensor having a wide dynamic range and high sensitivity in a low-frequency range can be obtained.

Second Embodiment

Figure 17:
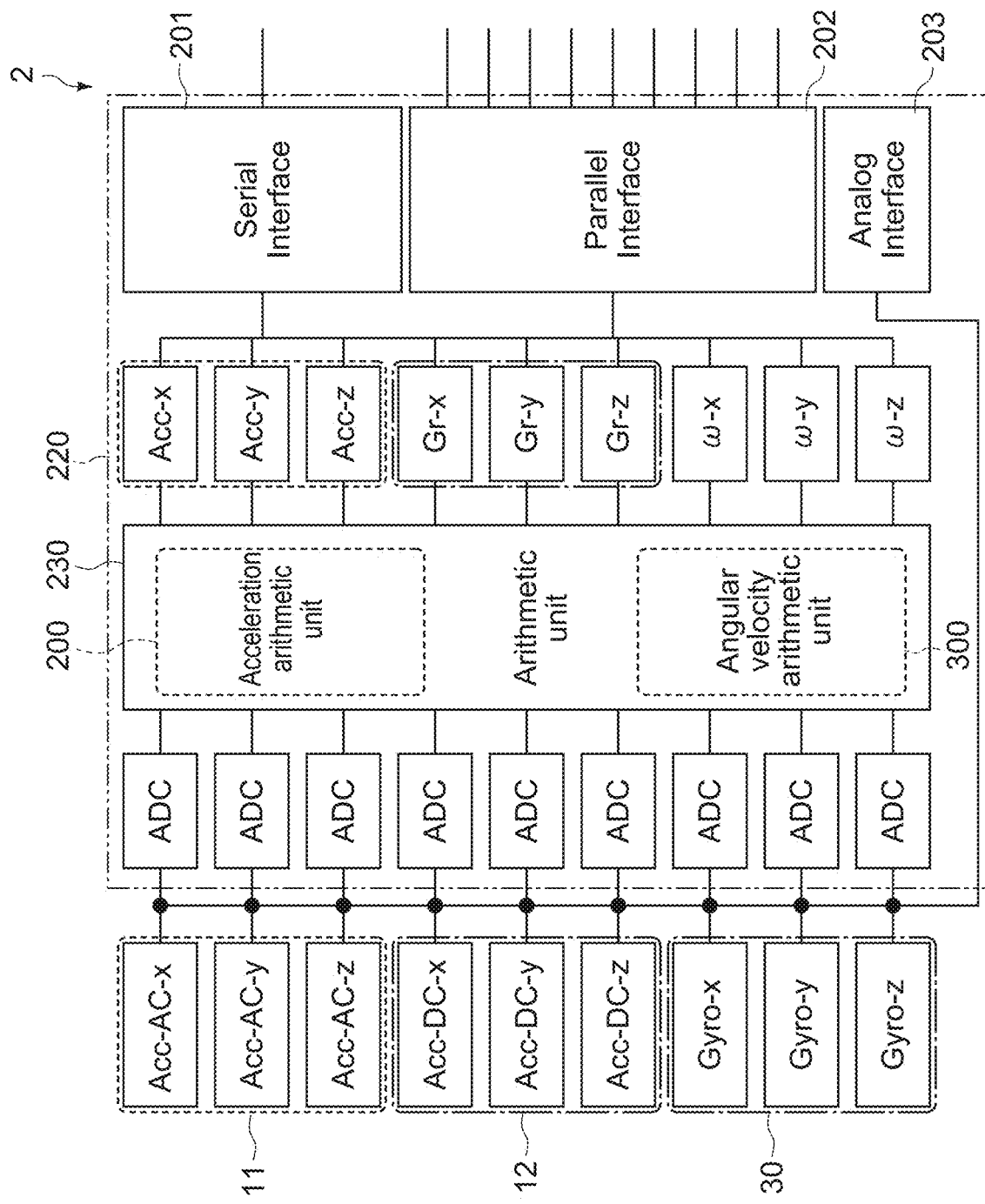
FIG. 17 is a block diagram showing a configuration of an inertial sensor according to a second embodiment of the present technology.

FIG. 17 is a block diagram showing a configuration of an inertial sensor according to a second embodiment of the present technology. Hereinafter, a configuration different from that of the first embodiment will be mainly described, and a configuration similar to that of the first embodiment will be denoted by a similar reference symbols and the description thereof will be omitted or simply described.

An inertial sensor 2 of this embodiment includes first and second acceleration detector units 11 and 12, an angular velocity detector unit 31, and an controller 220. The angular velocity arithmetic unit 300 outputs three-axis angular velocity detection signals (third detection signals) including information related to the angular velocities about the three axes, i.e., the x axis, the y axis, and the z axis. The controller 220 is different from the first embodiment in including, in addition to the acceleration arithmetic unit 200, the angular velocity arithmetic unit 300 that calculates angular velocities about the three axes on the basis of the three-axis angular velocity detection signals.

The angular velocity detector unit 31 may be constituted of a single, triaxial-integrated gyro sensor element capable of detecting the angular velocities about the three axes or may be constituted of a plurality of uniaxial or biaxial-integrated sensor elements in combination. The angular velocity arithmetic unit 300 calculates angular velocity signals about the three axes (ω-x, ω-y, ω-z) on the basis of the angular velocity detection signals about the three axes (Gyro-x, Gyro-y, Gyro-z), respectively, and outputs those signals to the outside via the serial interface 201, the parallel interface 202, or the analog interface 203. The angular velocity arithmetic unit 300 may be constituted separately from the acceleration arithmetic unit 200 or may be constituted of the arithmetic unit 230 in common with the acceleration arithmetic unit 200.

According to this embodiment, it is possible to detect not only the accelerations in the three-axis directions but also the angular velocities about the three axes. With this configuration, it is possible to simultaneously refer to the acceleration information and the angular velocity information and achieve further improvement in the detection accuracy of a motion, a posture, a position, or the like of a detection target.

For example, by combining the motion acceleration information calculated in the acceleration arithmetic unit 200 and the angular velocity information calculated in the angular velocity arithmetic unit 300, it is possible to calculate the radius of rotation or the rotation center of the detection target (see Japanese Patent No. 5407863).

(Gyro Sensor Element)

Figure 18A:
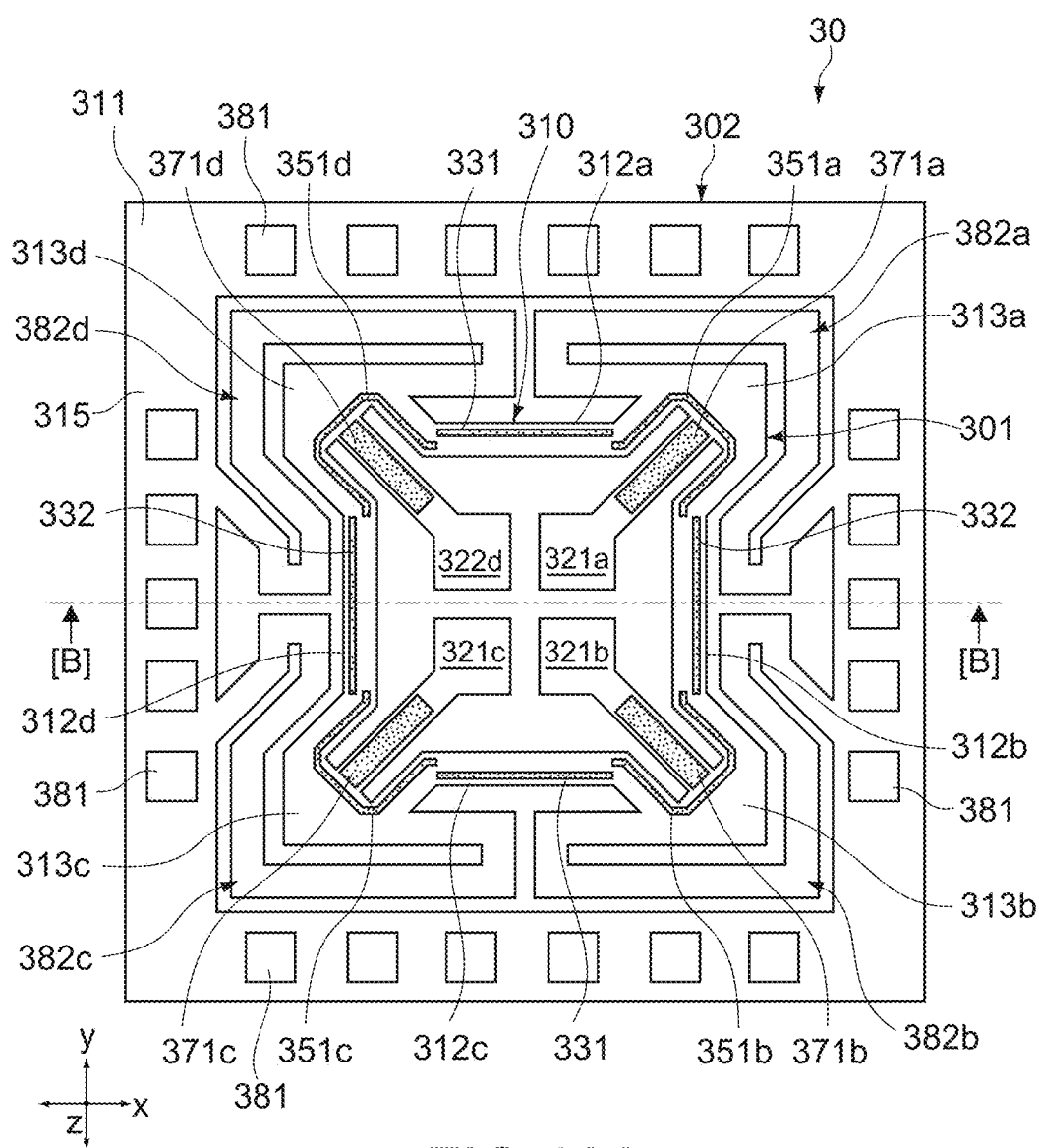
FIG. 18A is a plan view schematically showing a configuration of an angular velocity sensor element in the inertial sensor.
Figure 18B:
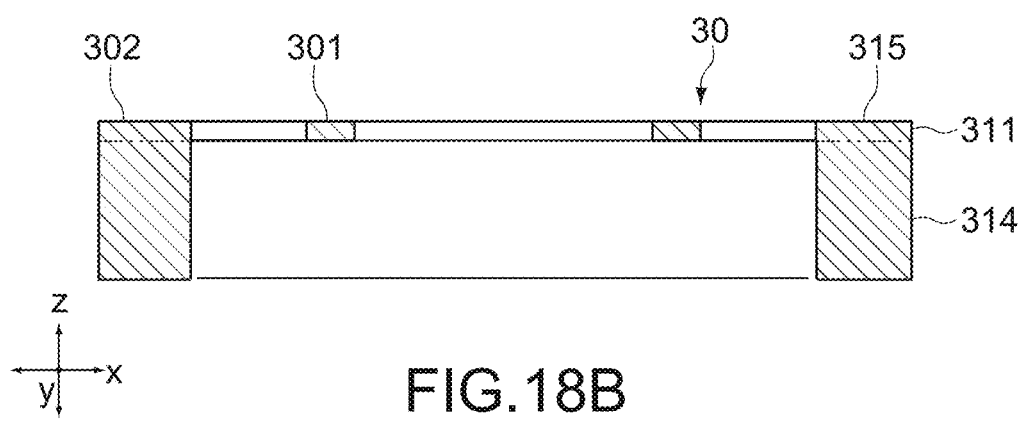
FIG. 18B is a cross-sectional view taken along the line [B]-[B] direction in FIG. 18A.

FIG. 18A is a schematic plan view showing a configuration example of a gyro sensor element. FIG. 18B is a schematic cross-sectional view taken along the line [B]-[B] in FIG. 18A. Hereinafter, a configuration of the gyro sensor element 30 will be described with reference to FIGS. 18A and 18B.

The gyro sensor element 30 is typically constituted of an SOI (Silicon On Insulator) substrate. As shown in FIG. 18B, the gyro sensor element 30 has a laminated structure including an active layer (silicon substrate) that forms a main surface portion 311 (second main surface), a frame-shaped support layer (silicon substrate) that forms a support portion 314 on the opposite side, and a joint layer (silicon oxide film) (not shown) that joins the main surface portion 311 and the support portion 314. The main surface portion 311 and the support portion 314 have thicknesses different from each other, and the support portion 314 is formed to be thicker than the main surface portion 311.

The gyro sensor element 30 includes an vibrator main body 301 that oscillates at a predetermined drive frequency and a frame body 302 that supports the vibrator main body 301 so as to be capable of vibrating.

The vibrator main body 301 is provided at the center portion of the main surface portion 311 and is formed by processing the active layer forming the main surface portion 311 into a predetermined shape. The main surface portion 311 is formed in parallel to the main surface portion 311 of the acceleration sensor element 10, and the circumferential portion thereof faces the support portion 314 in the z-axis direction. Those main surface portion 311 and support portion 314 constitute a base portion 315 (second base portion).

The vibrator main body 301 includes a rectangular ring-shaped frame 310, a plurality of pendulum portions 321a, 321b, 321c, and 321d.

The frame 310 includes a pair of first beams 312a and 312c and a pair of second beams 312b and 312d. The first beams 312a and 312c extend parallel to the x-axis direction in FIG. 18A and constitute a pair of opposite sides facing each other in the y-axis direction. The second beams 312b and 312d extend in the y-axis direction and constitute a pair of opposite sides facing each other in the x-axis direction. Each of the beams 312a to 312d has an identical length, width, and thickness and a cross section perpendicular to the longitudinal direction of each beam is formed to be substantially rectangular.

A plurality of (four in this example) connection portions 313a, 313b, 313c, and 313d that connect the beams 312a to 312d to one another are respectively formed in regions corresponding to the four corners of the frame 310. In other words, each of the beams 312a to 312d functions as a vibration beam, both ends of which are supported by the connection portions 313a to 313d.

Each of the pendulum portions 321a to 321d is constituted of a cantilever beam, one end of each of which is supported to a corresponding one of the connection portions 313a to 313d. The pendulum portions 321a to 321d typically have an identical shape and size and are simultaneously formed when the outer shape of the frame 310 is processed.

The pendulum portions 321a and 321c are respectively supported by the pair of connection portions 313a and 313c that have a mutually diagonal relationship, and protrude toward the center of the frame 310 along the diagonal line direction thereof to face each other in the vicinity of the center of the frame 310. Meanwhile, the pendulum portions 321b and 321d are respectively supported by the other pair of connection portions 313b and 313d that have a mutually diagonal relationship, and protrude toward the center of the frame 310 along the diagonal line direction thereof to face each other in the vicinity of the center of the frame 310.

The frame body 302 includes the ring-shaped base portion 315 disposed at the circumference of the vibrator main body 301, and a plurality of coupling portions 382a, 382b, 382c, and 382d disposed between the vibrator main body 301 and the base portion 315.

The base portion 315 is constituted of a quadrangular frame body that surrounds the outer side of the vibrator main body 301. A plurality of terminal portions (electrode pads) 381, which are electrically connected to connection pads provided to a second recess portion 152 of a package main body 15, are provided on the main surface (main surface portion 311) of the base portion 315.

The coupling portions 382a to 382d are provided between the respective connection portions 313a to 13d of the frame 310 and the base portion 315 and are configured to be deformable mainly within the xy plane by reception of vibrations of the frame 310. In other words, each of the coupling portions 382a to 382d functions as a suspension that supports the vibrator main body 301 so as to be capable of vibrating.

The vibrator main body 301 includes a plurality of piezoelectric drive units 331 and 332 that vibrate the frame 310 within the plane parallel to the main surface portion 311. The piezoelectric drive units 331 are disposed on the respective surfaces of the first beams 312a and 312c, and the piezoelectric drive units 332 are disposed on the respective surfaces of the second beams 312b and 312d.

The piezoelectric drive units 331 and 332 each have an identical configuration and are each formed into a strip shape parallel to the longitudinal direction of the beams 312a to 312d. The piezoelectric drive units 331 and 332 each have a laminated structure including a lower electrode layer, a piezoelectric film, and an upper electrode layer. The piezoelectric drive units 331 and 332 are mechanically deformed in response to an input voltage and vibrate the beams 312a to 312d by a driving force of the deformation.

Specifically, voltages of the phases opposite to each other are applied to the piezoelectric drive units 331 and 332 such that, when one extends, the other one contracts. With this configuration, in a case where the pair of first beams 312a and 312c vibrate in a direction moving close to each other, the pair of second beams 312b and 312d vibrate in a direction moving away from each other, and in a case where the pair of first beams 312a and 312c vibrate in a direction moving away from each other, the pair of second beams 312b and 312d vibrate in a direction moving close to each other. Such a vibration mode will be hereinafter referred to as a basic vibration of the frame 10.

The vibrator main body 301 further includes a plurality of first piezoelectric detector units 351a, 351b, 351c, and 351d and a plurality of second piezoelectric detector units 371a, 371b, 371c, and 371d.

The first piezoelectric detector units 351a to 351d (angular velocity detector units) are provided in the four connection portions 313a to 313d, respectively, and each detect an angular velocity about the z-axis, which is perpendicular to the main surface portion 311, on the basis of the amount of deformation in the main surface portion 311 of the frame 310. The second piezoelectric detector units 371a to 371d are provided on the respective surfaces of the pendulum portions 321a to 321d and each detect angular velocities about the two axes (e.g., x axis and y axis) orthogonal to the z axis on the basis of the amount of deformation of each of the pendulum portions 321a to 321d in the z-axis direction.

The first piezoelectric detector units 351a to 351d and the second piezoelectric detector units 371a to 371d each have a similar configuration and a laminate including a lower electrode layer, a piezoelectric film, and an upper electrode layer, and have a function of converting the mechanical deformation of the respective pendulum portions 321a to 321d into electrical signals.

In the gyro sensor element 30 of this embodiment, when an angular velocity about the z axis is generated in the frame 310 in the basic vibration, as shown in FIG. 19A, Coriolis force F0 resulting from the angular velocity acts on each point of the frame 310. With this configuration, the frame 310 is deformed so as to be distorted in the xy plane as shown in the figure. In this regard, when the amount of deformation of the frame 310 in the xy plane is detected by the first piezoelectric detector units 351a to 351d, the magnitude and direction of the angular velocity about the z axis that acts on the frame 310 can be detected.

Further, when an angular velocity about the x axis acts on the frame 310 vibrating in the basic vibration, as schematically shown in FIG. 19B, Coriolis force F1 in a direction orthogonal to the vibration direction at that time is generated in each of the pendulum portions 321a to 321d. With this configuration, one pair of pendulum portions 321a and 321d adjacent to each other in the x-axis direction are deformed in a positive direction of the z axis by the Coriolis force F1, and the amounts of deformation thereof are detected by the piezoelectric detector units 371a and 371d, respectively. Further, the other pair of pendulum portions 321b and 321c adjacent to each other in the x-axis direction are deformed in a negative direction of the z axis by the Coriolis force F1, and the amounts of deformation thereof are detected by the piezoelectric detector units 71b and 71c, respectively.

Similarly, when an angular velocity about the y axis acts on the frame 310 vibrating in the basic vibration, as schematically shown in FIG. 19C, Coriolis force F2 in a direction orthogonal to the vibration direction at that time is generated in each of the pendulum portions 321a to 321d. With this configuration, one pair of pendulum portions 321a and 321b adjacent to each other in the y-axis direction are deformed in a positive direction of the z axis by the Coriolis force F2, and the amounts of deformation thereof are detected by the piezoelectric detector units 371a and 371d, respectively. Further, the other pair of pendulum portions 321c and 321d adjacent to each other in the y-axis direction are deformed in a negative direction of the z axis by the Coriolis force F1, and the amounts of deformation thereof are detected by the piezoelectric detector units 371c and 371d, respectively.

It should be noted that also in a case where angular velocities about the axes in respective directions obliquely intersecting with the x axis and the y axis are generated, the angular velocity is detected on the principle similar to the one described above. In other words, each of the pendulum portions 321a to 321d is deformed by the Coriolis force corresponding to an x-direction component and a y-direction component of the angular velocity, and the amounts of deformation of the respective pendulum portions 321a to 321d are detected by the piezoelectric detector units 371a to 371d. The controller 220 extracts each of the angular velocity about the x axis and the angular velocity about the y-axis on the basis of the outputs of the piezoelectric detector units 371a to 371d. With this configuration, an angular velocity about an arbitrary axis parallel to the xy plane can be detected.

Third Embodiment

Figure 20:
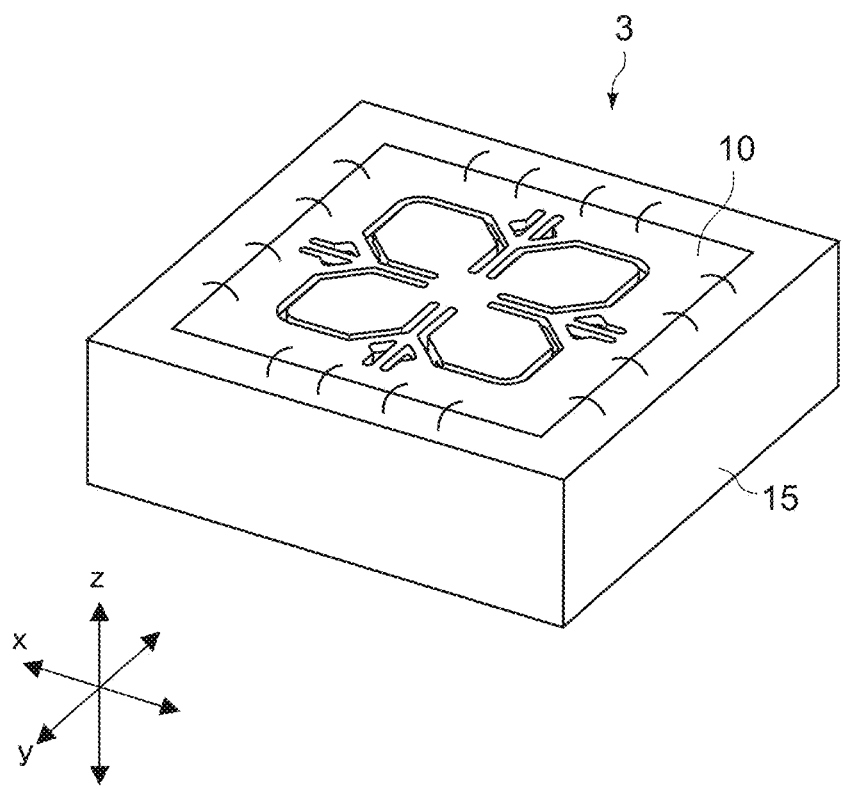
FIG. 20 is a schematic perspective view showing a configuration of an inertial sensor according to a third embodiment of the present technology.
Figure 21:
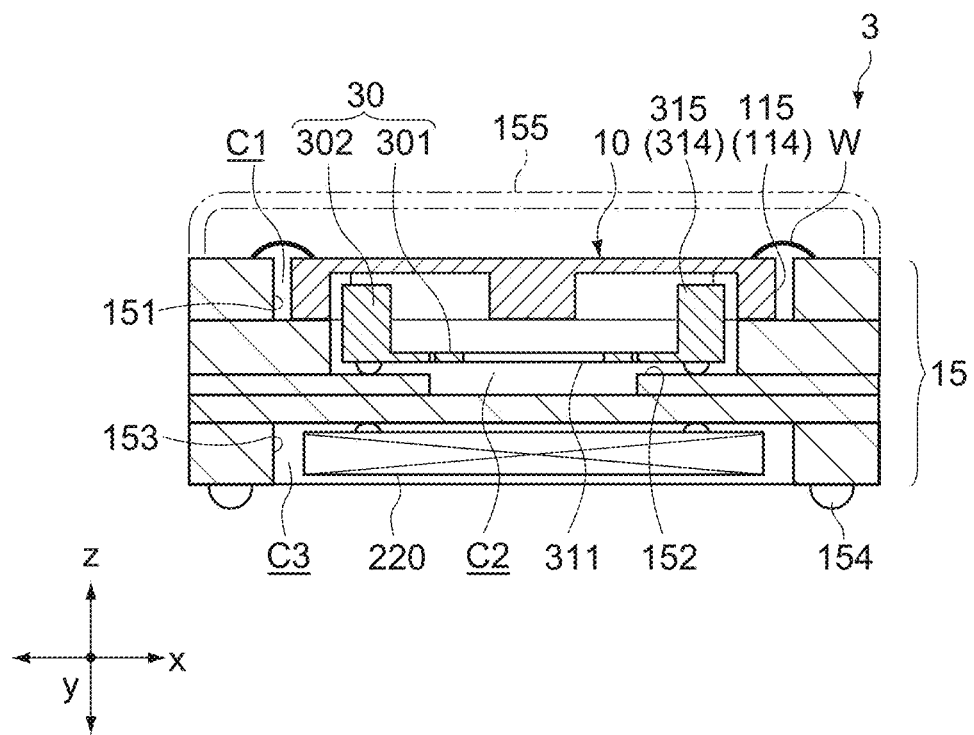
FIG. 21 is a schematic longitudinal sectional view of the inertial sensor.

FIG. 20 is a schematic perspective view showing a configuration of an inertial sensor according to a third embodiment of the present technology, and FIG. 21 is a schematic longitudinal sectional view thereof. Hereinafter, a configuration different from those of the first and second embodiments will be mainly described, and a configuration similar to those of the first and second embodiments will be denoted by a similar reference symbol and the description thereof will be omitted or simply described.

An inertial sensor 3 of this embodiment is constituted of a package component including an acceleration sensor element 10, a gyro sensor element 30, and a controller 220. With this configuration, a sensor package capable of detecting an acceleration and an angular velocity can be configured.

As shown in FIG. 21, the inertial sensor 3 includes a package main body 15 (support) that supports the acceleration sensor element 10, the gyro sensor element 30, and the controller 220. The package main body 15 is constituted of, for example, a ceramic multi-layer wiring board having a substantially rectangular parallelepiped shape and includes a first housing portion C1 that houses the acceleration sensor element 10, a second housing portion C2 that houses the gyro sensor element 30, and a third housing portion C3 that houses the controller 220.

The first housing portion C1 is defined by a first recess portion 151 formed in the surface of the package main body 15 (upper surface in FIG. 19). The acceleration sensor element 10 is joined to the bottom surface of the first recess portion 151 via the base portion 115 (support portion 114). The acceleration sensor element 10 is electrically connected to the package main body 15 via a bonding wire W connected between the relay terminal 140 on the base portion 115 and a connection pad on the package main body 15 (not shown).

The second housing portion C2 is defined by a second recess portion 152 provided in the bottom portion of the first recess portion 151. The gyro sensor element 30 is joined to a connection pad (not shown), which is provided on the bottom surface of the second recess portion 152, by a flip-chip mounting method. As described above, the gyro sensor element 30 is configured to be capable of detecting angular velocities about the x axis, the y axis, and the z axis, respectively.

The third housing portion C3 is defined by a third recess portion 153 formed in the back surface of the package main body 15 (lower surface in FIG. 19). The controller 220 is constituted of a semiconductor package element such as an IC chip, a CSP (Chip Size Package), or an MCM (Multi-Chip Module). The controller 220 is joined to a connection pad (not shown), which is provided on the bottom surface of the third recess portion 153, by the flip-chip mounting method.

External connection terminals 154 that are electrically connected to a circuit board (control board) of an electronic apparatus are provided on the back surface of the package main body 15. The external connection terminals 154 are electrically connected to the respective connection pads described above connected to the acceleration sensor element 10 (bonding wires W), the gyro sensor element 30, and the controller 220 via an internal wiring layer of the package main body 15. Further, a cover 155 that covers the acceleration sensor element 10 is joined to the surface of the package main body 15.

Figure 22:
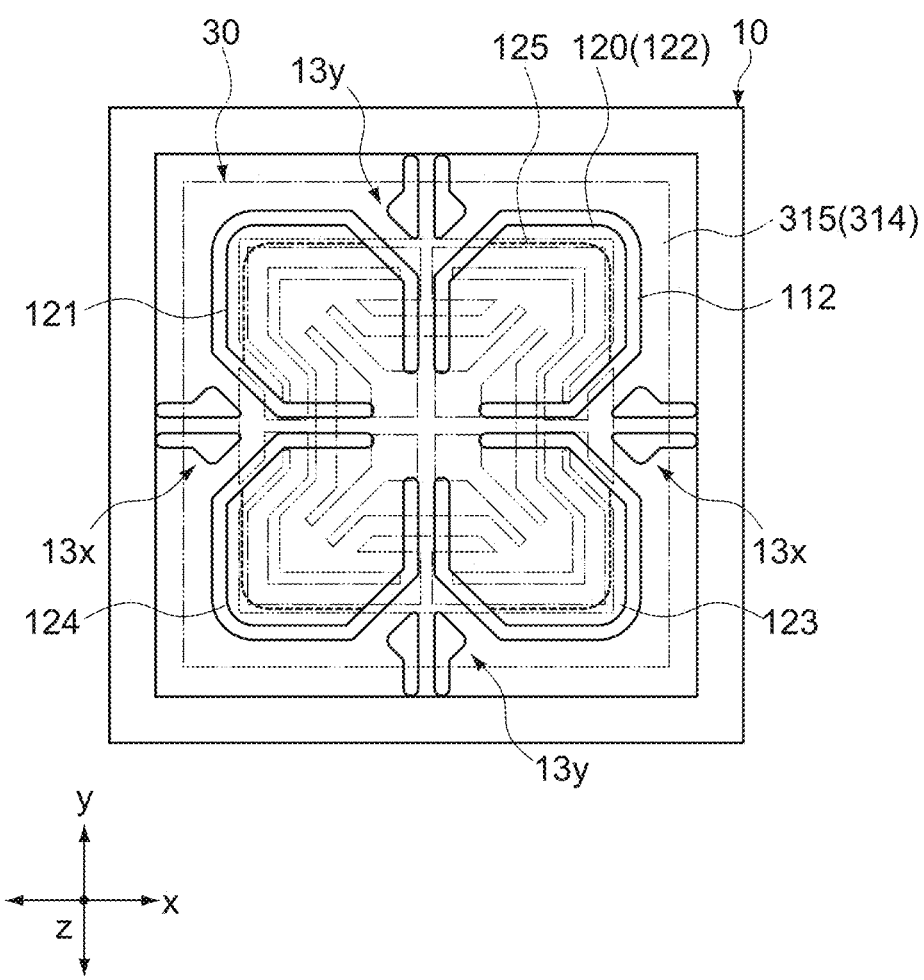
FIG. 22 is a plan view of a main part of the inertial sensor.

FIG. 22 is a plan view showing a relative position relationship of the acceleration sensor element 10 with the gyro sensor element 30.

As shown in FIGS. 21 and 22, the acceleration sensor element 10 is formed to be larger than the gyro sensor element 30 in plan view, and is disposed to face the gyro sensor element 30 in the z-axis direction such that the base portion 115 of the acceleration sensor element 10 surrounds the base portion 315 of the gyro sensor element 30. In other words, a part of the support portion 314 of the gyro sensor element 30 is housed in an inner space of the support portion 114 of the acceleration sensor element 10, and thus reduction in thickness of the package main body 15 can be achieved.

At that time, as shown in FIG. 22, the base portion 315 (support portion 314) of the gyro sensor element 30 is formed into a frame surrounding a weight portion 125 (see FIG. 3) provided on the back surface of the movable plate 120 (blade portions 121 to 124) of the acceleration sensor element 10, and the tips of the base portion 315 (support portion 314) face the circumferential portions of the respective blade portions 121 to 124 and the bridge portions 13x and 13y with gaps therebetween. When the base portion 315 is caused to face the circumference of the movable plate 120, an excessive amount of deformation of the movable plate 120 is restricted by those abutting actions.

The gap between the tip of the base portion 315 and the circumferential portion of each of the respective blade portions 121 to 124 is not particularly limited and appropriately set according to the size, mass, or the like of the movable plate 120. The gap only needs to have a value with which breakage of the bridge portions 13x and 13y due to an excessive amount of deformation of the movable plate 120 by a drop impact or the like can be prevented, and set to, for example, several tens of μm to several mm. The circumferential portion of the movable plate 120, which is faced by the base portion 315, is assumed as a region including the corner portions of the respective blade portions 121 to 124, but it is not limited thereto. A region other than the corner portion may be possible.

Fourth Embodiment

Figure 23:
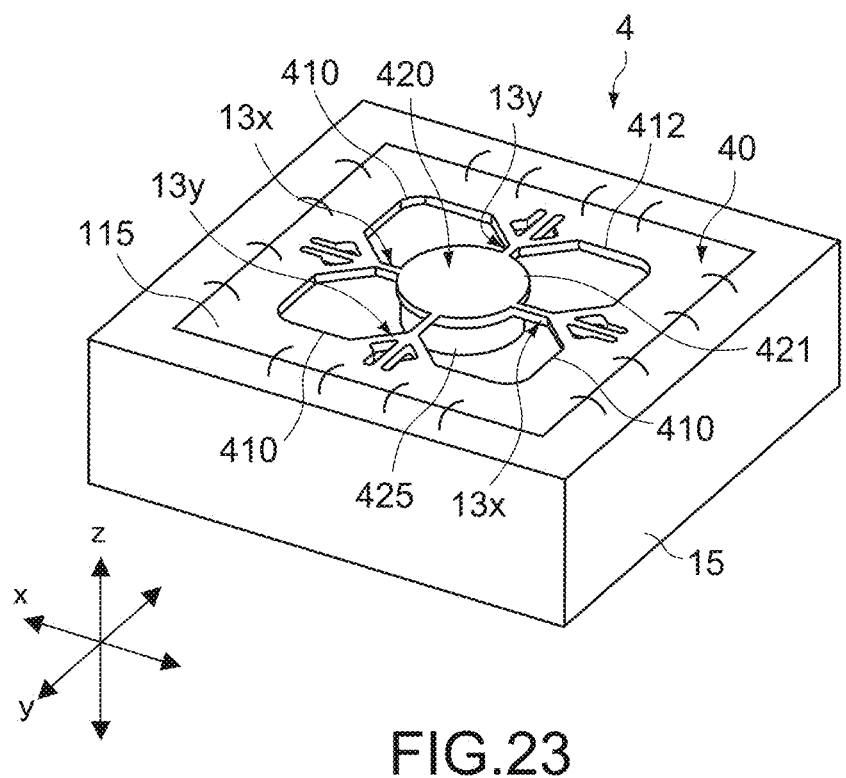
FIG. 23 is a schematic perspective view showing a configuration of an inertial sensor according to a fourth embodiment of the present technology.

FIG. 23 is a schematic perspective view showing a configuration of an inertial sensor according to a fourth embodiment of the present technology. Hereinafter, a configuration different from those of the first and second embodiments will be mainly described, and a configuration similar to those of the first and second embodiments will be denoted by a similar reference symbol and the description thereof will be omitted or simply described.

An inertial sensor 4 of this embodiment is constituted of a package component including an acceleration sensor element 40 and a package main body 15. This embodiment is different from the first embodiment in a configuration of the movable portion, and the acceleration sensor element 40 includes a movable body 420 having a schematic cylindrical shape. The movable body 420 includes a main surface portion 421 connected to the bridge portions 13x and 13y, and a weight portion 425 formed on the back surface side of the main surface portion 421, and is supported so as to be movable with respect to the base portion 115.

Figure 24:
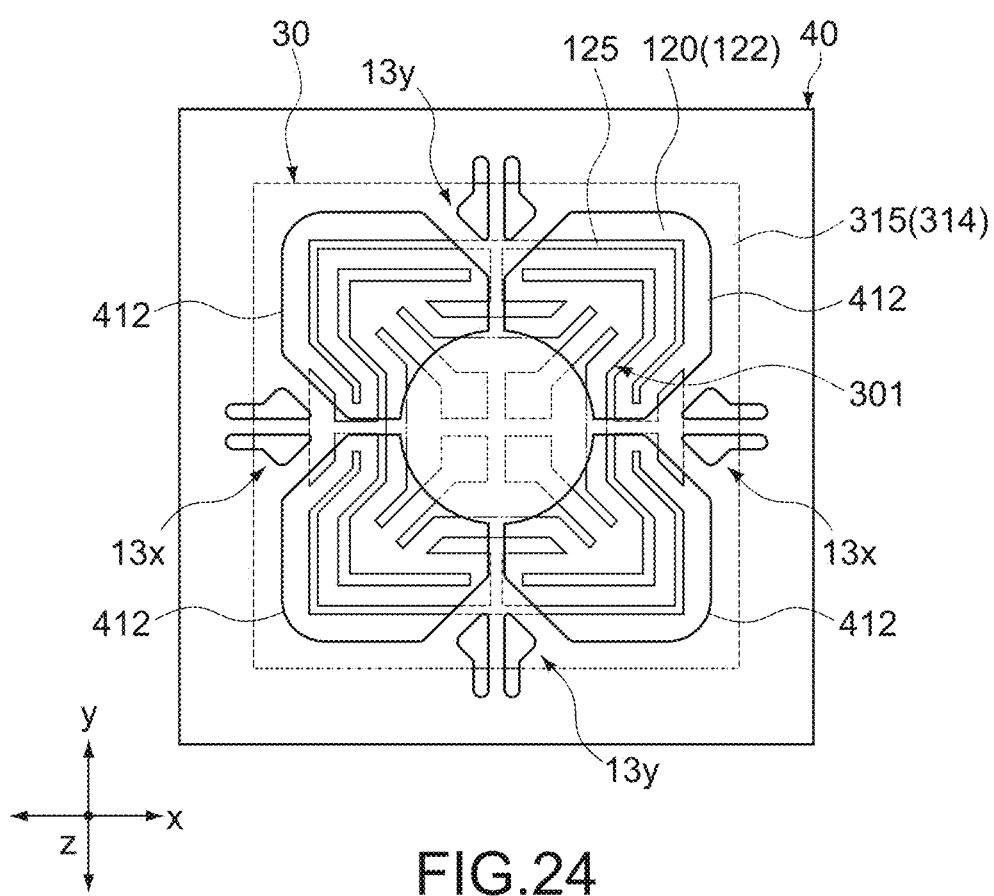
FIG. 24 is a plan view of a main part of the inertial sensor.

As in the third embodiment, the gyro sensor element 30 is housed inside the package main body 15. Further, the controller 220 may be incorporated in the package main body 15. FIG. 24 is a plan view showing a relative position relationship of the acceleration sensor element 40 with the gyro sensor element 30.

As shown in FIG. 24, the acceleration sensor element 10 includes a plurality of (four in this example) window portions 412 arrayed in the circumference of the main surface portion 421 while sandwiching the bridge portions 13x and 13y therebetween. The gyro sensor element 30 is partially exposed from above the acceleration sensor element 10 via those window portions 412. Thus, in a state where the acceleration sensor element 10 and the gyro sensor element 30 are housed in the package main body 15, the vibrator main body 301 can be irradiated with laser light via the window portions 412, so that the rectification of unnecessary vibration of the vibrator main body 301, the adjustment of the resonant frequency (detuning degree), and the like can be easily performed.

Fifth Embodiment

Figure 25:
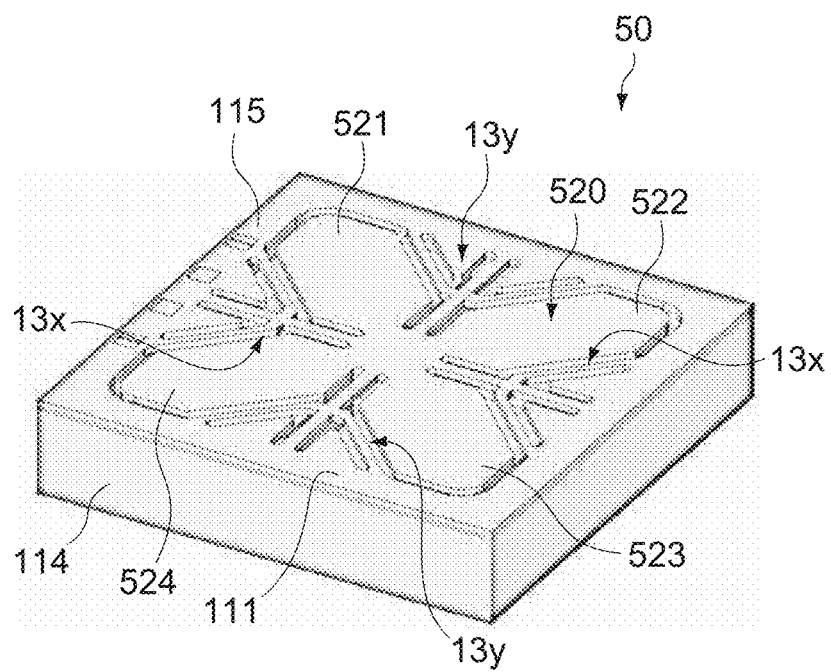
FIG. 25 is a perspective view of the front surface of an acceleration sensor element according to a fifth embodiment of the present technology.
Figure 26:
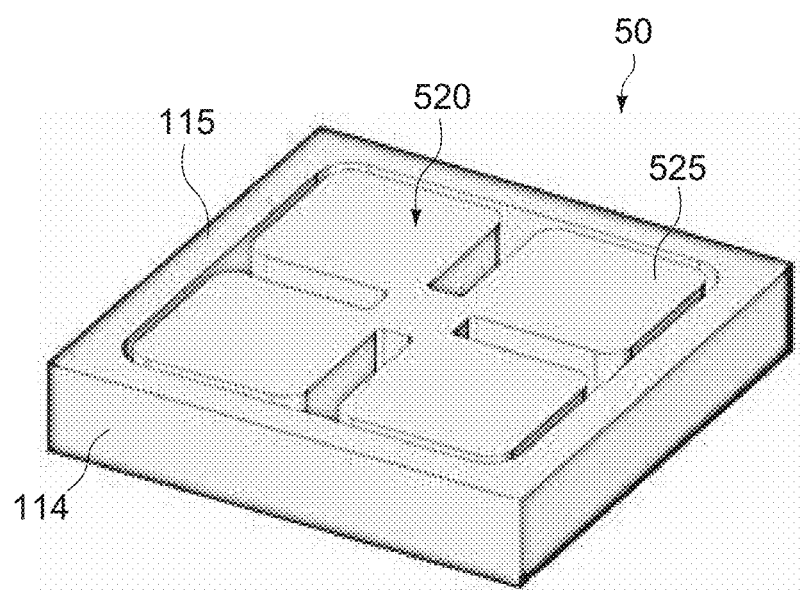
FIG. 26 is a perspective view of the back surface side of the acceleration sensor element.
Figure 27:
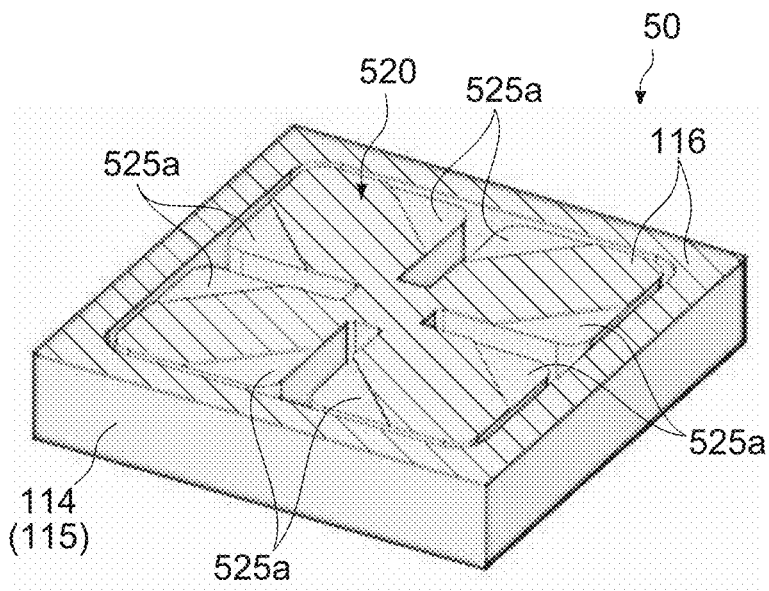
FIG. 27 is a cross-sectional perspective view of a main part of the acceleration sensor element.

FIGS. 25 to 27 are each a perspective view of an acceleration sensor element according to a fifth embodiment of the present technology. FIG. 25 is a perspective view of the front surface side, FIG. 26 is a perspective view of the back surface side, and FIG. 27 is a cross-sectional perspective view of a main part. Hereinafter, a configuration different from that of the first embodiment will be mainly described, and a configuration similar to that of the first embodiment will be denoted by a similar reference symbol and the description thereof will be omitted or simply described.

As in the first embodiment, an acceleration sensor element 50 of this embodiment is constituted of an SOI (Silicon On Insulator) substrate and has a laminated structure including an active layer (silicon substrate) that forms a main surface portion 111, a frame-shaped support layer (silicon substrate) that forms a support portion 114, and a joint layer 116 (FIG. 27) that joins the main surface portion 111 and the support portion 114. A frame-shaped base portion 115 is constituted of a circumferential portion of the main surface portion 111 and the support portion 114, and the joint layer 116 is made of a silicon oxide film.

The acceleration sensor element 50 includes a movable plate 520 that is elastically supported to the base portion 115 via a plurality of bridge portions 13x and 13y. The movable plate 520 includes a plurality of (four in this example) blade portions 521, 522, 523, and 524 (wing portions) each having the shape symmetric with respect to the center of the movable plate 520, and a weight portion 525 is integrally provided on the back surface side thereof.

As in the first embodiment, the planar shape of each of the blade portions 521 to 524 is formed into a schematic hexagonal shape. In contrast to this, the weight portion 525 is formed into a schematic quadrangular shape covering the entire bottom surfaces of the blade portions 521 to 524, and thus has widened portions 525a that protrude from each of both end sides of the blade portions 521 to 524 to the outside (see FIGS. 26 and 27). The widened portions 525a face the bridge portions 13x and 13y with a predetermined gap in the z-axis direction. The bridge portions 13x and 13y are constituted by processing the main surface portion 111 into a predetermined shape, as in the case of each of the blade portions 521 to 524. Therefore, the predetermined gap has a size corresponding to the thickness of the joint layer 116, and the size thereof can be appropriately set according to the sensor size or the like, and set to, for example, several tens of μm to several mm.

In the acceleration sensor element 50 of this embodiment, the weight portion 525 includes the widened portion 525a that protrudes in the in-plane direction of each of the blade portions 521 to 524, and thus the weight portion 525 can be efficiently enlarged within a limited region immediately below the movable plate 520. With this configuration, both of the increase in sensitivity and the reduction in size and thickness of the acceleration sensor element 50 can be achieved.

Further, since each widened portion 525a of the weight portion 525 faces the bridge portions 13x and 13y with a predetermined gap, the motion range of the movable plate 520 is suitably ensured. Further, when the movable plate 520 moves excessively by a drop impact or the like, the widened portion 525a abuts on each of the bridge portions 13x and 13y, and the breakage of the bridge portions 13x and 13y due to an excessive amount of deformation can be prevented.

It should be noted that a relationship between the bridge portions 13x and 13y and the widened portion 525a of the weight portion 525 facing each other may be used to detect, from changes in capacitance of both of them, the motion of the movable plate 520, i.e., an acceleration that acts on the movable plate 520. In this case, as a detection element constituting the second acceleration detector unit, an electrode pattern to be a counter electrode may be formed on each of the bridge portion 13x, 13y and the widened portion 525a, or a silicon substrate itself constituting those above may be used an as an electrode.

Sixth Embodiment

Subsequently, a sixth embodiment of the present technology will be described. In this embodiment, another technique of calculating an acceleration, in which countermeasures against the sensitivity along other axes are taken, will be described.

Figure 28:
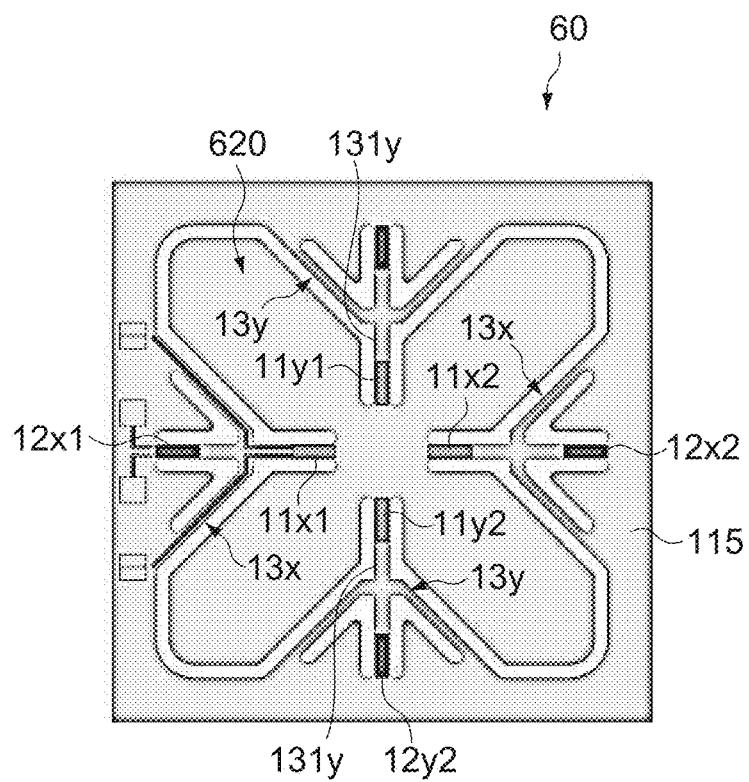
FIG. 28 is a schematic plan view showing a configuration of an acceleration sensor element according to a sixth embodiment of the present technology.

FIG. 28 is a schematic plan view showing a configuration of an acceleration sensor element 60 of this embodiment.

Hereinafter, a configuration different from that of the first embodiment will be mainly described, and a configuration similar to that of the first embodiment will be denoted by a similar reference symbol and the description thereof will be omitted or simply described.

As shown in the figure, the acceleration sensor element 60 of this embodiment includes a base portion 115, a movable plate 620 (movable portion), and a plurality of bridge portions 13$x$ and 13$y$ that elastically support them. In this embodiment, first, each blade portion of the movable plate 620 is formed to be longer in the diagonal direction of the base portion 115 than in the first embodiment, and thus the area is enlarged and the sensitivity along other axes due to the increase in mass is less likely to be generated.

Next, the principle of the generation of the sensitivity along other axes will be simply described.

For example, in a case where an acceleration of 1 G is applied to the x axis, an acceleration in the x-axis direction is detected as a value (1 G) corresponding to a difference signal (ax1−ax2) between the output of the detection element 11$x$1 (ax1) and the output of the detection element 11$x$2 (ax2). At that time, the acceleration does not act in the y-axis direction, and thus the difference signal (ax1−ax2) between the outputs of the detection elements 11$x$1 and 11$x$2 should be 0 G in principle.

However, torsional stress is generated in a region between the movable plate 120 and the bridge portion 13$y$ on the beam portion 131$y$ on which the detection elements 11$y$1 and 11$y$2 are disposed, and by reception of that stress (tensile component or compression component), there is a possibility that the detection elements 11$y$1 and 11$y$2 may output a minute but significant detection signal (unnecessary signal). This becomes the sensitivity along other axes.

In this regard, in this embodiment, using the vibration apparatus as shown in FIG. 5A, a calibration value (correction parameter) with which the unnecessary signal is corrected is stored in a memory of a computer (e.g., acceleration arithmetic unit 200), and the output of each detection element is calculated with the correction parameter. Hereinafter, an example thereof will be described.

As described above, when accelerations are applied in the respective x-, y-, and z-axis directions, each of the detection elements 11$x$1 to 11$y$2 outputs a detection signal as follows. Here, the outputs of the first acceleration detector unit 11 (11$x$1 to 11$y$2) in the respective axial directions are represented by xa, ya, and za.

$$xa = ax1 - ax2 \quad (1)$$

$$ya = ay1 - ay2 \quad (2)$$

$$za = ax1 + ax2 + ay1 + ay2 \quad (3)$$

If the above expressions (1) to (3) are represented as $\alpha(x)+\beta(y)+\gamma(z)$ for the sake of convenience, in a case where the acceleration along the x-axis direction is applied, ideally, the output in the x-axis direction is a true value (a coefficient $\alpha$ is 1, and the other coefficients $\beta$ and $\gamma$ are 0). Meanwhile, while considering that a significant signal is output in the y-axis and z-axis directions ($\beta$ and $\gamma$ are not 0) depending on the accuracy of manufacturing the sensor element, the $\beta$ and $\gamma$ are measured in advance by using the vibration apparatus described above or the like and used as correction parameters for a calculation for correcting the accelerations by the following calculation methods.

$$xa = \alpha(x) - \beta(y) - \gamma(z) \quad (4)$$

$$ya = \beta(y) - \alpha(x) - \gamma(z) \quad (5)$$

$$za = \gamma(z) - \alpha(x) - \beta(y) \quad (6)$$

In other words, in this embodiment, when the second term and the third term on the right side in each of the above-mentioned expressions (4) to (6) are inserted as correction terms in the above-mentioned expressions (1) to (3), a calculation method of subtracting the significant unnecessary signal generated by the sensitivity along other axes is employed. With this configuration, a minute influence of multi-axis sensitivity, which is not sufficiently suppressed by only the ingenuity of a physical support structure of the movable plate 620 by the bridge portions 13$x$ and 13$y$, can be effectively reduced.

It should be noted that detection signals of the detection elements 12$x$1 to 12$y$2 constituting the second acceleration detector unit 12 may also be corrected by a technique similar to that described above.

Hereinabove, the embodiments of the present technology have been described, but the present technology is not limited to the embodiments described above and can be variously modified as a matter of course.

For example, in the first embodiment described above, the acceleration detection method of extracting the dynamic acceleration component and the static acceleration component has been described as an exemplary acceleration detection method, but the present technology is not limited thereto. For example, from the viewpoint of the suppression of the sensitivity along other axes, on the basis of the output of the first acceleration detector unit 11, the output of the first acceleration detector unit 11 may be corrected by the output of the second acceleration detector unit 12.

Further, in the embodiments describe above, the first detection elements 11$x$1 to 11$y$2 constituting the first acceleration detector unit 11 are constituted of piezoelectric acceleration detection elements, and the second detection elements 12$x$1 to 12$y$2 constituting the second acceleration detector unit 12 are constituted of non-piezoelectric (piezoresistive, electrostatic) acceleration detection elements, but the present technology is not limited thereto. All of the detection elements may be constituted of piezoelectric acceleration detection elements, or all of the detection elements may be constituted of non-piezoelectric acceleration detection elements.

Figure 29A:
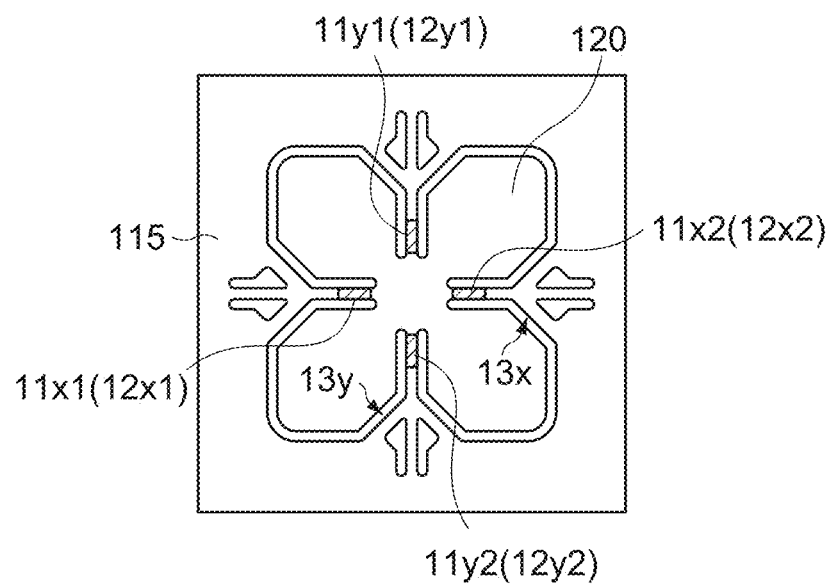
FIG. 29A is a schematic plan view of an acceleration sensor element, showing a modified example of a configuration of an acceleration detector unit.
Figure 29B:
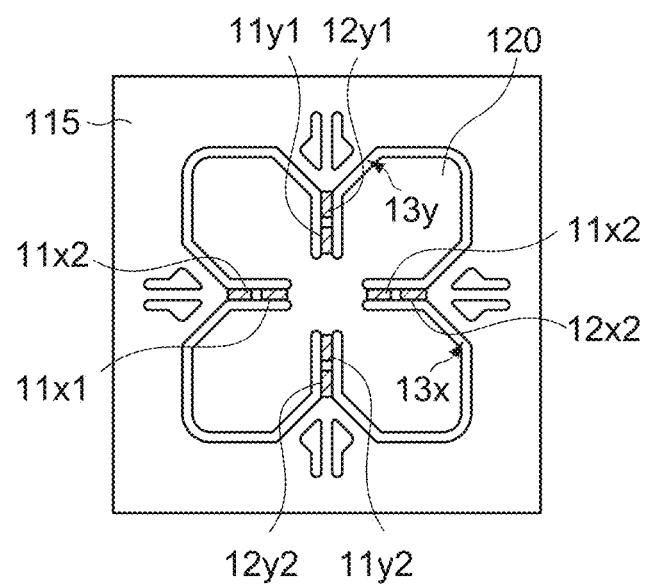
FIG. 29B is a schematic plan view of an acceleration sensor element, showing another modified example of a configuration of an acceleration detector unit.

Furthermore, the arrangement of the second acceleration detector unit 12 (detection elements 12$x$1 to 12$y$2) in the acceleration sensor element 10 is not limited to that in the examples described above. For example, as shown in FIG. 29A, the detection elements 12$x$1 to 12$y$2 may be disposed at the same positions as those of the first acceleration detector unit 11 (detection elements 11$x$1 to 11$y$2). In this case, the detection elements 12$x$1 to 12$y$2 may be disposed on the lower-layer side of the detection elements 11$x$1 to 11$y$2 or may be disposed on the upper-layer side thereof. Further, as shown in FIG. 29B, the detection elements 12$x$1 to 12$y$2 may be disposed in the same regions on the bridge portions 13$x$ and 13$y$, in which the detection elements 11$x$1 to 11$y$2 are provided.

It should be noted that the present technology can also have the following configurations.

(1) A sensor element, including:
   a base portion having a main surface;
   a movable portion that is movable relative to the base portion by reception of an acceleration along at least a uniaxial direction;
   a first bridge portion including
      a first beam that extends in a first axis direction parallel to the main surface and connects the base portion and the movable portion, and a first structure that is provided between the first beam and the base portion and supports the first beam;
a second bridge portion including
a second beam that extends in a second axis direction orthogonal to the first axis and parallel to the main surface and connects the base portion and the movable portion, and
a second structure that is provided between the second beam and the base portion and supports the second beam; and
a first acceleration detector unit that is disposed on each of the first beam and the second beam and outputs a first detection signal corresponding to an amount of deformation of each of the first beam and the second beam.

(2) The sensor element according to (1), in which
each of the first beam and the second beam includes
a first end portion connected to the movable portion,
a second end portion connected to the base portion, and
a joint portion provided between the first end portion and the second end portion, and
each of the first structure and the second structure is provided between the base portion and the joint portion.

(3) The sensor element according to (2), in which
each of the first structure and the second structure includes a pair of reinforcement beams that are not parallel to the first beam and the second beam.

(4) The sensor element according to (2) or (3), in which
the first acceleration detector unit is disposed between the first end portion and the joint portion on each of the first beam and the second beam.

(5) The sensor element according to any one of (2) to (4), further including
a second acceleration detector unit that is disposed on each of the first beam and the second beam and outputs a second detection signal corresponding to an amount of deformation of each of the first beam and the second beam.

(6) The sensor element according to (5), in which
the second acceleration detector unit is disposed between the second end portion and the joint portion.

(7) The sensor element according to any one of (1) to (6), in which
the first acceleration detector unit includes a piezoelectric acceleration detection element.

(8) The sensor element according to (5) or (6), in which
the second acceleration detector unit includes any one of a piezoelectric acceleration detection element, a piezoresistive acceleration detection element, and an electrostatic acceleration detection element.

(9) The sensor element according to any one of (1) to (8), in which
the base portion has a frame shape surrounding a circumference of the movable portion,
the movable portion has a shape symmetric with respect to the center of the base portion, and
each of the first beam and the second beam includes a pair of beam portions facing each other with the movable portion being sandwiched therebetween.

(10) The sensor element according to (9), in which
the movable portion includes
a center portion supported by the first beam and the second beam,
a plurality of wing portions each having a shape symmetric with respect to the center portion, and
weight portions respectively provided to the plurality of wing portions.

(11) An inertial sensor, including
an acceleration sensor element including
a first base portion having a first main surface,
a movable portion that is movable relative to the first base portion by reception of an acceleration along at least a uniaxial direction,
a first bridge portion including
a first beam that extends in a first axis direction parallel to the first main surface and connects the first base portion and the movable portion, and
a first structure that is provided between the first beam and the first base portion and supports the first beam,
a second bridge portion including
a second beam that extends in a second axis direction orthogonal to the first axis and parallel to the first main surface and connects the first base portion and the movable portion, and
a second structure that is provided between the second beam and the first base portion and supports the second beam,
a first acceleration detector unit that is disposed on each of the first beam and the second beam and outputs a first detection signal corresponding to an amount of deformation of each of the first beam and the second beam, and
a support including a first housing portion that houses the first base portion.

(12) The inertial sensor according to (11), further including
a gyro sensor element capable of detecting an angular velocity about at least one axis, in which
the support further includes a second housing portion that houses the gyro sensor element.

(13) The inertial sensor according to (12), in which
the gyro sensor element includes
a second base portion that has a second main surface parallel to the first main surface and is supported by the second housing portion,
a ring-shaped frame that is supported to be capable of vibrating with respect to the second base portion, and
an angular velocity detector unit that detects an angular velocity about the third axis on a basis of an amount of deformation of the frame in a plane parallel to the second main surface.

(14) The inertial sensor according to (13), in which
the support includes
a first recess portion that defines the first housing portion, and
a second recess portion that is provided in the first recess portion and defines the second housing portion, and
the acceleration sensor element and the angular velocity sensor element are disposed to face each other in the third axis direction.

(15) The inertial sensor according to (14), in which
the first base portion surrounds a circumference of the second base portion, and
the second base portion faces the bridge portion with a gap therebetween.

(16) The inertial sensor according to (15), in which
the second base portion is formed into a frame shape surrounding a circumference of the weight portion and faces the circumferential portion of the movable portion with a gap therebetween.

(17) The inertial sensor according to (14) or (15), in which
the acceleration sensor element further includes a window portion that is provided between the movable portion and the base portion and partially exposes the frame in the third axis direction.

(18) The inertial sensor according to any one of (11) to (17), in which
the acceleration sensor element further includes a second acceleration detector unit that is disposed on each of the first beam and the second beam and outputs a second detection signal corresponding to an amount of deformation of each of the first beam and the second beam, and
the first detection signal has an alternating-current waveform corresponding to the acceleration that acts on the movable portion, and
the second detection signal has an output waveform in which an alternating-current component corresponding to the acceleration along the acceleration is superimposed on a direct-current component, and
the inertial sensor further includes an arithmetic element that extracts a dynamic acceleration component and a static acceleration component from the acceleration on a basis of the first detection signal and the second detection signal.
(19) The inertial sensor according to (18), in which
the support further includes a third housing portion that houses the arithmetic element.
(20) An electronic apparatus, including
a sensor element including
a base portion having a main surface,
a movable portion that is movable relative to the base portion by reception of an acceleration along at least a uniaxial direction,
a first bridge portion including
a first beam that extends in a first axis direction parallel to the main surface and connects the base portion and the movable portion, and
a first structure that is provided between the first beam and the base portion and supports the first beam,
a second bridge portion including
a second beam that extends in a second axis direction orthogonal to the first axis and parallel to the main surface and connects the base portion and the movable portion, and
a second structure that is provided between the second beam and the base portion and supports the second beam, and
a first acceleration detector unit that is disposed on each of the first beam and the second beam and outputs a first detection signal corresponding to an amount of deformation of each of the first beam and the second beam.

REFERENCE SIGNS LIST 1 to 4 inertial sensor
10, 40, 50, 60 acceleration sensor element
11 (11$x$1, 11$x$2, 11$y$1, 11$y$2) first acceleration detector unit
12 (12$x$1, 12$x$2, 12$y$1, 12$y$2) second acceleration detector unit
13$x$, 13$y$ bridge portion
15 package main body
20, 220 controller
21 gain adjustment circuit
24 correction circuit
110 element main body
115, 315 base portion
120, 520, 620 movable plate
121 to 124, 521 to 524 blade portion
125, 425 weight portion
131$x$, 131$y$ beam portion
132$x$, 132$y$ structure
200 acceleration arithmetic unit
300 angular velocity arithmetic unit
412 window portion
420 movable body

The invention claimed is:
1. A sensor element, comprising:
a base portion that includes a main surface;
a movable portion movable based on reception of an acceleration along at least a uniaxial direction, wherein the movable portion is movable relative to the base portion;
a first bridge portion that includes:
a first beam that extends in a first axis direction parallel to the main surface and connects the base portion and the movable portion, and
a first structure between the first beam and the base portion,
wherein the first structure supports the first beam;
a second bridge portion that includes:
a second beam that extends in a second axis direction orthogonal to the first axis and parallel to the main surface, wherein the second beam connects the base portion and the movable portion, and
a second structure between the second beam and the base portion, wherein
the second structure supports the second beam,
each of the first beam and the second beam includes:
a first end portion connected to the movable portion,
a second end portion connected to the base portion, and
a joint portion between the first end portion and the second end portion, and
each of the first structure and the second structure is between the base portion and the joint portion;
a first acceleration detector unit on each of the first beam and the second beam, wherein the first acceleration detector unit is configured to output a first detection signal that corresponds to an amount of deformation of each of the first beam and the second beam; and
a second acceleration detector unit on each of the first beam and the second beam, wherein the second acceleration detector unit is configured to output a second detection signal that corresponds to an amount of deformation of each of the first beam and the second beam.
2. The sensor element according to claim 1, wherein each of the first structure and the second structure includes a pair of reinforcement beams that are not parallel to the first beam and the second beam.
3. The sensor element according to claim 1, wherein the first acceleration detector unit is between the first end portion and the joint portion.
4. The sensor element according to claim 1, wherein the second acceleration detector unit is between the second end portion and the joint portion.
5. The sensor element according to claim 1, wherein the first acceleration detector unit includes a piezoelectric acceleration detection element.
6. The sensor element according to claim 1, wherein the second acceleration detector unit includes one of a piezoelectric acceleration detection element, a piezoresistive acceleration detection element, or an electrostatic acceleration detection element.
7. The sensor element according to claim 1, wherein
the base portion has a frame shape that surrounds a circumference of the movable portion,
the movable portion has a shape symmetric with respect to a center of the base portion, each of the first beam and the second beam includes a first pair of beam portion and a second pair of beam portion, the first pair of beam portion faces the second pair of beam portion, and the movable portion is between the first pair of beam portion and the second pair of beam portion.

8. The sensor element according to claim 7, wherein the movable portion includes:

a center portion supported by the first beam and the second beam, a plurality of wing portions, wherein each wing portion of the plurality of wing portions has a shape symmetric with respect to the center portion, and a plurality of weight portions, wherein the plurality of weight portions corresponds to the plurality of wing portions.

9. An electronic apparatus, comprising:

a sensor element that includes:

a base portion that includes a main surface, a movable portion movable based on reception of an acceleration along at least a uniaxial direction, wherein the movable portion is movable relative to the base portion, a first bridge portion that includes:

a first beam that extends in a first axis direction parallel to the main surface and connects the base portion and the movable portion, and a first structure between the first beam and the base portion, wherein the first structure supports the first beam, a second bridge portion that includes:

a second beam that extends in a second axis direction orthogonal to the first axis and parallel to the main surface, wherein the second beam connects the base portion and the movable portion, and a second structure between the second beam and the base portion, wherein the second structure supports the second beam, each of the first beam and the second beam includes:

a first end portion connected to the movable portion, a second end portion connected to the base portion, and a joint portion between the first end portion and the second end portion, and each of the first structure and the second structure is between the base portion and the joint portion;

a first acceleration detector unit on each of the first beam and the second beam, wherein the first acceleration detector unit is configured to output a first detection signal that corresponds to an amount of deformation of each of the first beam and the second beam; and a second acceleration detector unit on each of the first beam and the second beam, wherein the second acceleration detector unit is configured to output a second detection signal that corresponds to an amount of deformation of each of the first beam and the second beam.

\* \* \* \* \*